(12) United States Patent
Lyon

(10) Patent No.: US 7,478,429 B2
(45) Date of Patent: Jan. 13, 2009

(54) NETWORK OVERLOAD DETECTION AND MITIGATION SYSTEM AND METHOD

(75) Inventor: Barrett Lyon, Sacramento, CA (US)

(73) Assignee: Prolexic Technologies, Inc., Hollywood, FL (US)

( * ) Notice: Subject to any disclaimer, the term of this patent is extended or adjusted under 35 U.S.C. 154(b) by 267 days.

(21) Appl. No.: 10/956,721

(22) Filed: Oct. 1, 2004

(65) Prior Publication Data

US 2006/0075491 A1  Apr. 6, 2006

(51) Int. Cl.
*G06F 11/00* (2006.01)
*G06F 12/14* (2006.01)
*G06K 17/00* (2006.01)

(52) U.S. Cl. ................... 726/23; 726/2; 726/22
(58) Field of Classification Search ............ 726/2, 726/22
See application file for complete search history.

(56) References Cited

U.S. PATENT DOCUMENTS

| | | | |
|---|---|---|---|
| 6,311,278 B1 | 10/2001 | Raanan et al. | |
| 6,321,337 B1 | 11/2001 | Reshef et al. | |
| 6,584,569 B2 | 6/2003 | Reshef et al. | |
| 6,633,835 B1 * | 10/2003 | Moran et al. | 702/190 |
| 7,020,783 B2 | 3/2006 | Vange et al. | |
| 7,092,357 B1 * | 8/2006 | Ye | 370/230 |
| 2002/0032871 A1 | 3/2002 | Malan et al. | |
| 2002/0083175 A1 | 6/2002 | Afek et al. | |
| 2002/0101819 A1 | 8/2002 | Goldstone | |
| 2002/0103916 A1 | 8/2002 | Chen et al. | |

(Continued)

FOREIGN PATENT DOCUMENTS

WO  WO 02/075548 A1  9/2002

OTHER PUBLICATIONS

"CERT Advisory CA-1996-21 TCP SYN Flooding and IP Spoofing Attacks," internet article at http://www.cert.org/advisories/CA-1996-21.html.

(Continued)

*Primary Examiner*—Nasser Moazzami
*Assistant Examiner*—Chinwendu C Okoronkwo
(74) *Attorney, Agent, or Firm*—Frank J. DeRosa; Jon Gordon; Frommer Lawrence & Haug LLP

(57) ABSTRACT

A system and method is disclosed for detecting and/or mitigating an overload condition from one or more first computers, such as a distributed denial of service (DDoS) attack, viral attack, or the like, targeting one or more of a plurality of second computers located on a network. While one or more DDoS attacks are mitigated, a meter, detection apparatus, software, or method, detects the condition being mitigated in a data cleaning center, and provides an alert or notification regarding the mitigated attack.

Another preferred embodiment relates, in general terms, to a system and method for detecting and/or mitigating an overload or attempted overload condition targeting a domain name server. A network connection is provided for receiving one or more DNS requests from one or more client computers located on a network. A preferred embodiment includes a processor for providing a response to the one or more DNS requests to the one or more client computers if more than a threshold number of duplicate DNS requests are received.

Another preferred embodiment relates, in general terms, to a system and method for detecting and/or mitigating an attempted overload condition targeting a networked computer system that uses a redirection module to divert data until it is deemed to be clean.

51 Claims, 10 Drawing Sheets

U.S. PATENT DOCUMENTS

| | | | |
|---|---|---|---|
| 2002/0184362 | A1 | 12/2002 | Banerjee et al. |
| 2002/0199109 | A1 | 12/2002 | Boom |
| 2003/0014665 | A1 | 1/2003 | Anderson et al. |
| 2003/0023733 | A1 | 1/2003 | Lingafelt et al. |
| 2003/0061514 | A1 | 3/2003 | Bardsley et al. |
| 2003/0145232 | A1 | 7/2003 | Poletto et al. |
| 2003/0145233 | A1 | 7/2003 | Poletto et al. |
| 2003/0172289 | A1 | 9/2003 | Soppera |
| 2003/0226032 | A1 | 12/2003 | Robert |
| 2003/0236999 | A1 | 12/2003 | Brustoloni |
| 2004/0008681 | A1 | 1/2004 | Govindarajan et al. |
| 2004/0054925 | A1 | 3/2004 | Etheridge et al. |
| 2005/0058149 | A1* | 3/2005 | Howe .................... 370/428 |

OTHER PUBLICATIONS

CERT Coordination Center, "Packet Filtering for Firewall Systems," internet article at http://www.cert.org/tech_tips/packet_filtering.html.

Network Ingress Filtering: Defeating Denial of Service Attacks which employ IP Source Address Spoofing (Memo), internet article at http:/www.faqs.org/rfcs/rfc2267.html.

"Protecting Web Servers from Distributed Denial of Service Attacks," Kargl et al., pp. 514-524, Department of Multimedia Computing, Univeristy of Germany, WWW10, May 1-5, 2001, Hong Kong.

ICMP Packet Filtering v1.2, by Rob Thomas, Mar. 12, 2003, internet article at http:www.cymru.com/Documents/icmp-messages.html.

Autonomic Systems—Combating DDoS Attacks, SecurityScape, internet article at http://www.securesynergy.com/library/articles/037-2003.php.

"DDoS Mitigation via Regional Cleaning Centers," Sharad Agarwal et al., University of California, Berkeley, Sprint ATL Research Report RR04-ATL-013177, Jan. 2004.

* cited by examiner

NETWORK OVERLOAD DETECTION AND MITIGATION SYSTEM AND METHOD

FIELD OF THE INVENTION

This invention relates to a system and method for preventing distributed denial of service (DDoS) attacks, or the like, via a network, such as the Internet. In particular, the invention relates to a data cleaning center having attack detection and/or mitigation modules that provide DDoS attack-free data to back-end servers.

BACKGROUND OF THE INVENTION

During the past few decades, the Internet has provided a convenient way to obtain a wealth of information on almost any subject. Many paid and free information services may be offered over the Internet, including electronic mail, home shopping, gaming, paperless billing services, and the like. Users merely need to obtain a web page address or uniform resource locator (URL) for the service they desire.

In this regard, commercial revenue for Internet-based operations has steadily increased, even for those companies that offer their Internet services for free. The companies that offer free services may obtain revenue from related non-Internet services offered to their customers or through advertising on their web site. For example, many banks offer free on-line banking services to their account holders. Further, the most popular Internet search engine providers charge for advertising on their search engine web sites, which are accessed by millions of Internet users every day.

However, as the customer base for on-line services has grown dramatically over the years, so have the opportunities for those who wish to engage in malicious activity targeting Internet web sites. What originated as several individuals, or hackers, breaking into systems for unauthorized viewing of information or sending individual virus attacks against selected systems just for the thrill of doing so, has evolved into extortion-based, multi-front, attacks on many systems or whole sub-networks within the Internet.

For example, many offshore extortionists have developed ways to extract significant revenue from companies located in multiple jurisdictions. These extortionists avoid prosecution by law enforcement by launching their malicious attacks from countries in which they may avoid prosecution, either legally or practically. Further, the extortionists may obfuscate their identities by launching attacks from different computers at different locations.

Typically, an extortionist pre-warns a web site owner before an attack, demanding that a sum of money is wired to an anonymous, foreign account. For example, in the case of a gaming web site, the extortionist may wait until just before a significant event, such as an on-line poker tournament, or in the case of gambling, a major horse race, such as the Kentucky Derby. An electronic mail message may be sent to the site owner with the warning and appropriate bank account information. If the site owner does not pay the amount requested by the extortionist, then the extortionist may cause an attack to occur at the peak time for usage of the web site during the event. Still an attack may essentially shut down operations for the site. Acknowledging that the threat is real, the site owner will likely pay a potentially significant sum of money, rather than risk the loss of a significant profit obtained during the special event or peak time of the year.

The methods available to the extortionist are many. For example, one type of malicious attack that may target a system is called a distributed denial of service (DDoS) attack. This type of attack is universally acknowledged as being one of the most troublesome types of attacks of our time. A DDoS attack includes "flooding" a host computer or network with information. The flood of information can consume all available bandwidth of the host computer's or network's computing resources, thereby preventing legitimate network traffic from reaching the host network and further preventing an individual user from accessing the services of the host network. More particularly, the attacker can consume bandwidth through a network flood either by generating a large number of data packets, which contain data exchanged over the Internet, or by generating a small number of extremely large packets, directed to the target computer or network. Typically, those packets comprise Internet Control Message Protocol (ICMP) packets, User Datagram Protocol (UDP) stream attack packets, TCP SYN flood packets, or packets used in TCP based attacks such as GET flood attacks that typically occur after handshaking is completed and a session is started. In principle, however, the packets can include any form.

The attacker can execute the flood attack from a single computer. This comprises a non-distributed or conventional denial of service (DoS) attack. Alternatively, during a DDoS attack, the attacker coordinates or co-opts several computers on different networks to achieve the same effect. The attacker also can falsify (spoof) the source IP address of the packets, thereby making it difficult to trace the identity of the computers used to carry out the attack. Spoofing the source IP address also can shift attention onto innocent third parties.

An attacker also may execute a more defined attack using spoofed packets called a "broadcast amplification" or a "smurf attack." In this common attack, the attacker generates packets with a spoofed source address of the target. The attacker then sends a series of network requests using the spoofed packets to an organization having many computers. The packets contain an address that broadcasts the packets to every computer within the organization. Every computer within the organization then responds to the spoofed packet requests and sends data on to the target site. Accordingly, the target computer or network becomes flooded with the responses from the organization. Unfortunately, the target site then may blame the organization for the attack.

Further, recent attacks have been launched against domain name service (DNS) servers. DNS servers are essential to the operation of the Internet, as they provide the key function of converting alphanumeric domain names, such as XYZ.com, into the number based Internet protocol (IP) addresses on which each Internet connection is ultimately based. Attackers have discovered a new way to bring down whole segments of the Internet by attacking the DNS servers themselves, instead of the computers that the IP addresses identify.

To date, systems for detecting and mitigating DoS or DDoS attacks have been few. Some prior systems or solutions have individually used or proposed different tools or software, sometimes in the form of so-called firewalls, in an attempt to combat such attacks. These tools or software may include: systems that detect half-open connections that are typically caused by many attacks; systems that compare headers of packets to specific, known flood attack headers; or systems that monitor data packet flow that is above average or that exceed various thresholds.

However, while these prior systems have experienced some success, such success has been limited. For example, typical systems attempt to prevent attacks from one or more computers, each of which having one source, and each targeted toward a single computer. These prior systems typically require identification of the source computers involved in the attacks, as well as the target, to compare duplicate source and target values to threshold values at the network or lower layers of the open system interconnect (OSI) model. If the attack detection tools are successfully spoofed at lower levels of the OSI model, this leaves higher levels of the OSI model, such as the application layer, vulnerable to subsequent attacks. This is true, because the prior systems assume that the data passing through a connection is safe after it has passed through the tools at the lower layers.

Thus, none of the prior systems provide for reliable universal protection of many computer systems or nodes through one access point, regardless of the source and target of an attack. Further, none of the prior systems provide for reliable universal protection of several computer systems or nodes at the same time, or after a connection has been deemed as safe using typical tools at lower levels of the OSI model.

Finally, none of the prior systems provide for reliable protection of DNS servers to prevent whole networks from becoming non-operational. Accordingly, there is a need in the art for a system and method that solves the problems associated with such prior systems.

SUMMARY OF THE INVENTION

Briefly, and in general terms, a preferred embodiment relates to a system and method for detecting and/or mitigating an overload condition from one or more first computers, such as a distributed denial of service (DDoS) attack, viral attack or the like, targeting one or more of a plurality of second computers located on a network. The network may comprise any type of public or private network, such as the Internet, intranet, virtual private network (VPN) or the like. While one or more DDoS attacks originating from the one or more first computers on the network are mitigated, a meter, detection apparatus, software, or method, detects the condition being mitigated in a data cleaning center, and in one embodiment, it provides an alert or notification regarding the mitigated attack.

A preferred embodiment comprises a data cleaning center, preferably as a stand-alone node on the network, which has a network connection for receiving a volume of data, and which may be measured as $D_{in}$, over a time period, $P_{in}$. The data may be received from, for example, one or more first computers located on the network.

The overload condition is directed to one more of a plurality of second computers located on the network. Typically, the second computers are server computers, and the first computers are client or user computers. However, a preferred embodiment does not necessarily differentiate between client and server computers in detecting and mitigating the overload condition. Thus, each of the first and second computers may comprise a server, client, networked electronic device, or any type of network node. Sometimes, for example, an attempted overload condition in the form of a SYN-flood attack may be launched from several different computers, including servers and clients, that are unwittingly infected with a SYN-flood virus.

One embodiment includes one or more attack detection and/or mitigation modules that are used for detecting and/or mitigating the attempted overload condition. One purpose of the attack detection and/or mitigation modules is to produce a volume of data that is free from the data causing the overload or attempted overload condition, called clean data, or $D_{out}$, herein, for sending to the one or more second computers. The amount or volume of the clean data may be measured as $D_{out}$, over a time period, $P_{out}$.

In one embodiment, a meter is included to perform the task of measuring $D_{in}$ and $D_{out}$ and for comparing such measurements to determine whether the attempted or actual overload condition has been mitigated by the attack detection and/or mitigation modules. The meter determines that such an attempted or actual overload condition directed toward one or more of the second computers has been mitigated if $D_{out}$ divided by $P_{out}$ is substantially less than $D_{in}$ divided by $P_{in}$.

One embodiment includes an alert apparatus to provide an alert if the meter detects an overload or attempted overload condition. The alert apparatus may provide an electronic mail alert, an audible alert, a visible alert, or the like, if an attempted overload condition is detected by the meter.

In one embodiment, the one or more attack detection and/or mitigation modules include a module that determines whether a number of duplicate GET commands have been received that exceeds a threshold value. Another attack mitigation module may also include a module that determines whether a user agent header entry in a packet header of a received data packet contains an alphabetical character. If not, the data packet is discarded. Further, one attack detection/and or mitigation module is included that determines whether a host value header entry exists in a packet header of a data packet, and if not, discards the data packet.

Another preferred embodiment relates, in general terms, to a system and method for detecting and/or mitigating an overload or attempted overload condition targeting a domain name service (DNS) server. A network connection is provided for receiving one or more DNS requests from one or more client computers located on a network. A preferred embodiment includes a processor for providing a response to the one or more DNS requests to the one or more client computers before normal processing by the domain name server.

The added processor preferably executes processes used to detect whether the one or more DNS requests comprise an attempted overload condition before allowing processing of the requests by the domain name server. If an overload or attempted overload condition is detected by the processor, then processing by the domain name server of the DNS requests is performed by the processor. Specifically, the requests are diverted to the processor, which comprises high-speed application specific hardware that can process requests much faster than typical DNS servers. Once the overload condition or attempted overload condition has subsided, processing of the requests are re-diverted back to the DNS server.

Another preferred embodiment relates, in general terms, to a system and method for detecting and/or mitigating an attempted overload condition targeting a networked computer system by counting a number of duplicate GET commands received. A network connection is provided for receiving a plurality of data packets from one or more first computers located on a network, wherein the data packets include a plurality of GET commands directed toward one or more second computers located on the network. An attack detection and/or mitigation module is provided that comprises a module to compare the received GET commands, and to determine whether a threshold number of the received GET commands are duplicative. If the threshold value is exceeded by the duplicate GET commands, then the attack mitigation module blocks or discards the duplicate GET commands from processing by the one or more second computers.

Due to the large volume of GET commands that may be received, a database function may be performed on the received GET commands to determine if the GET commands are duplicates. The database function may include a hashing algorithm applied to the GET commands to speed processing and to use less memory.

Another preferred embodiment relates, in general terms, to a system and method for detecting and/or mitigating an attempted overload condition targeting a networked computer system that checks the user agent header entry of a packet header. A preferred embodiment includes a network connection for receiving a data packet having a packet header. An attack detection and/or mitigation module is provided to determine whether a user agent header entry in the packet header contains an alphanumeric character. Thus, the attack detection and/or mitigation module discards the data packet if the user agent header entry contains a non-alphanumeric character. Further, patterns in the user agent entry and/or other header entries may be detected that may indicate an attack.

Another preferred embodiment relates, in general terms, to a system and method for detecting and/or mitigating an attempted overload condition targeting a networked computer system that checks the host value header entry of a packet. A network connection is provided for receiving a data packet having a packet header. An attack detection and/or mitigation module determines whether a host value header entry exists in the packet header. The attack detection and/or mitigation module discards the data packet if the host value header entry does not exist in the packet header.

Another preferred embodiment relates, in general terms, to a system and method for detecting and/or mitigating an attempted overload condition targeting a networked computer system that checks line break indicators in packets. A network connection is provided for receiving a data packet. An attack detection and/or mitigation module determines whether the data packet contains valid line break indicators. An example of a non-valid line break indicator is one that only contains one of a carriage return character (CR) or a line feed character (LF), and not both. The attack detection and/or mitigation module discards the data packet if the data packet does not contain a valid line break indicator.

Another preferred embodiment relates, in general terms, to a system and method for detecting and/or mitigating an attempted overload condition targeting a networked computer system that uses a redirection module to divert data until it is deemed to be clean. A network connection is provided for receiving one or more initial data packets from one or more first computers for processing by a second computer. A redirection module redirects the first computer to send the one or more initial data packets to a third computer. An attack detection and/or mitigation module determines whether the one or more initial data packets are a part of an overload or attempted overload condition. The redirection module then redirects the one or more first computers to send one or more subsequent data packets directly to the second computer if the attack detection and/or mitigation module determines that the initial data packets are not a part of an attempted overload condition. Otherwise, the data from the one or more first computers remains re-directed to the third computer. These and other aspects of the invention will become apparent from the following more detailed description, when taken in conjunction with the accompanying drawings of illustrative embodiments.

DETAILED DESCRIPTION

Figure 1:
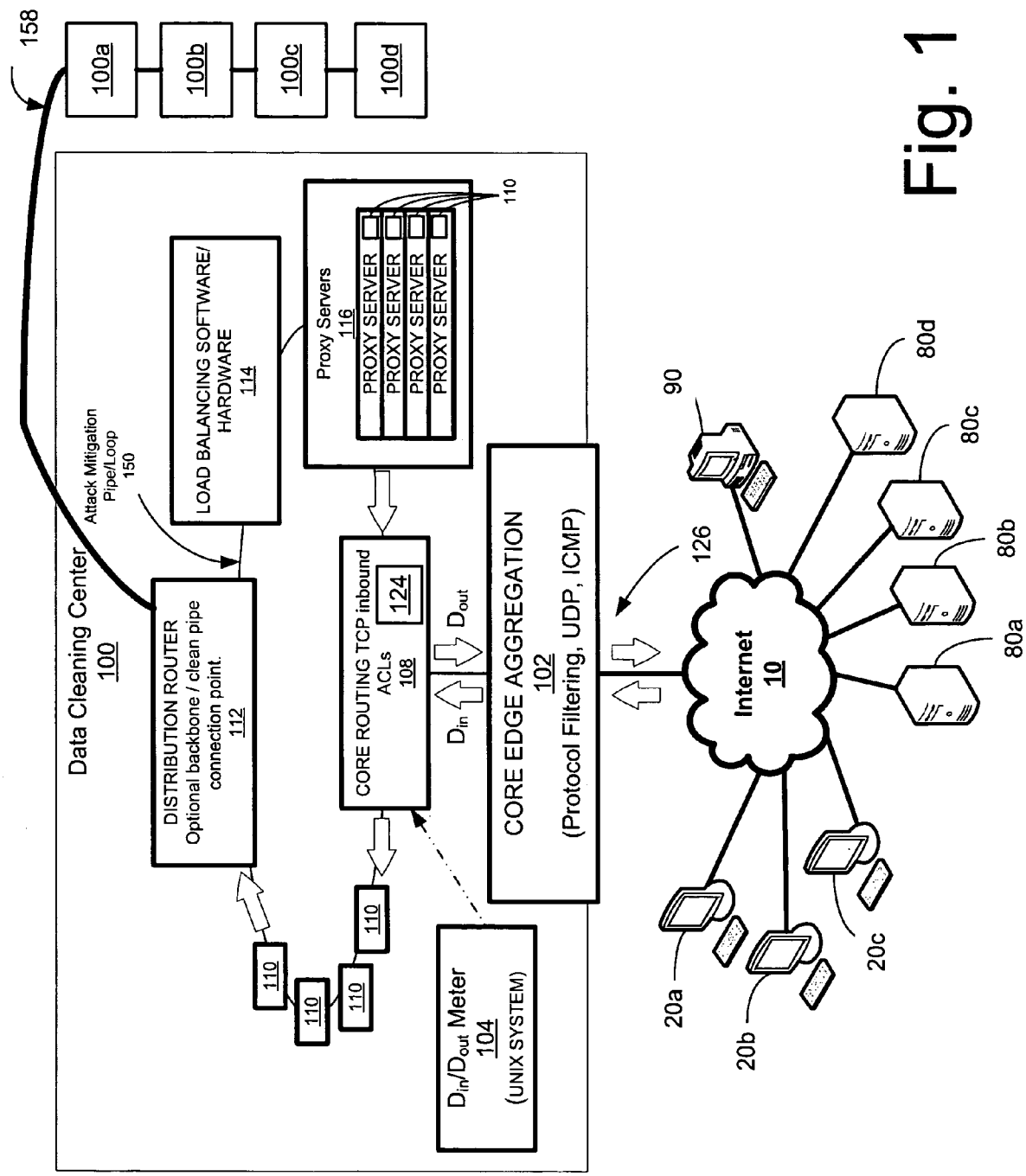
FIG. 1 is a block diagram of a data cleaning center according to an exemplary embodiment of the system and method for detecting and/or mitigating an overload or attempted overload condition.

A preferred embodiment of a system and method for detecting and/or mitigating an overload condition, constructed in accordance with the claimed invention, provides detection and/or mitigation of an overload condition style attack from one or more first computers that target one or more of a plurality of second computers located on a network. Such attack includes, by way of example only, and not by way of limitation a distributed denial of service (DDoS) attack, viral attack or the like. The network may comprise any type of public or private network, such as the Internet, intranet, virtual private network (VPN) or the like.

Referring now to the drawings, like reference numerals denote like or corresponding parts throughout the drawing figures.

Referring now to FIG. 1, a preferred data cleaning center 100 is illustrated, according to an exemplary embodiment of the system and method for detecting and/or mitigating an overload or attempted overload condition (hereinafter "an attack"). In a preferred embodiment, the data cleaning center 100 operates as a stand-alone node on a network 10, which has a network connection 126 for receiving a volume of data, which is measured as $D_{in}$, over a time period, $P_{in}$. The network connection 126 comprises a core edge aggregation router 102 to provide a backbone connection to the network 10. Core edge aggregation routers 102 that are available from, for example, Juniper Networks or Cisco Systems, are able to provide Internet connections of 76 gigabits per second or larger. In one embodiment, the data cleaning center 100 is configured to provide attack free, or clean, data to hundreds or thousands of servers, a core edge aggregation router 102 having a capability in the 1 to 76 gigabit per second range is desirable, although not necessary.

Through the network connection 126, data may be received from, for example, one or more first computers 20a, 20b and 20c located on the network 10. Typically, the one or more first computers 20a, 20b and 20c comprise client computers or devices used by Internet users for accessing one or more second computers 80a, 80b 80c and 80d also located on the network 10. In one embodiment, it is preferable for all data to pass through the data cleaning center 100. In other words, both requests and responses to and from servers preferably pass through the data cleaning center 100.

Preferably, the data cleaning center 100 discards all data packets that are a part of the received data, $D_{in}$, that use User Datagram Protocol (UDP) or Internet Control Message Protocol (ICMP). This is performed because, presently, these are common protocols used to launch DDoS attacks against the second computers 80a, 80b, 80c and 80d. Further, many commercial networks do not need to use UDP and ICMP protocols. The filtering of UDP and ICMP packets may be performed by the core edge aggregation router 102. However, if it becomes more common to use a different type of protocol to launch attacks against the second computers 80a, 80b, 80c and 80d, then the core edge aggregation router 102 may be re-tuned to filter and discard data packets using such protocol. Alternatively, the core aggregation router 102 may discard all data packets, except those having selected protocols, such as Transmission Control Protocol (TCP).

In one preferred embodiment, a core router 108 is provided that has or connects to, an inbound access control list (ACL) 124 for sanity checking, which typically includes confirming that the target node is listed in the ACL. Specifically, each incoming packet is preferably checked against the ACL, which provides a list, or range, of valid IP addresses for the second computers 80a, 80b, 80c and 80d serviced by the data cleaning center 100. If a data packet is not directed to, or coming from, an IP address contained in the ACL 124, it is discarded.

In a preferred embodiment, a meter 104 is either connected to the core router, or within the core router for measuring the received data, $D_{in}$. The meter 104 preferably operates on a Unix-based platform or other platform, and preferably performs its measurement of the received data, $D_{in}$, from the core router 108 after the filtering of the UDP and ICMP data packets by the core edge aggregation router 102. However, in some embodiments it is desirable to include measurements of the UDP and ICMP data packets received by the data cleaning center 100. In those embodiments, the meter 104 is preferably connected to the core edge aggregation router 102 instead of the core router 108.

After the core router 108 has completed its processing procedures, the received data, $D_{in}$, is preferably further processed by one or more attack detection and/or mitigation tools or modules 110 (referred to herein as attack mitigation modules). In one embodiment, the one or more attack mitigation modules 110 are used to detect, mitigate, prevent and/or suppress one or more DDoS attacks that originate from the one or more of the first computers 20a, 20b and 20c on the network 10, and are directed to the one or more second computers 80a, 80b, 80c and 80d, located on the network 10.

Typically, the one or more second computers 80a, 80b, 80c and 80d at which an attack is targeted, are server computers, and the one or more first computers 20a, 20b and 20c from which an attack originates, are client or user computers. However, a preferred embodiment does not necessarily differentiate between client and server computers in detecting and/or mitigating an attack. Thus, each of the first and second computers may comprise a server, client, networked electronic device, or any type of network node. Sometimes, for example, an attack in the form of a SYN-flood attack is launched from several different computers, including servers, clients, company networks or sub-networks that are unwittingly infected with a SYN-flood virus.

Furthermore, it may be desirable to detect and mitigate attacks using multiple different techniques. As such, some preferred embodiments use more than one attack mitigation module 110. In some embodiments, the attack mitigation modules 110 are chained or combined, for example, by providing a series of processors connected within a preferably high-speed local fiber optic network, or attack mitigation pipe or loop 150, within the data cleaning center 110. Preferably, the attack mitigation modules 110 are embodied in hardware, software, or via a combination of hardware and software.

There are several types of attack mitigation modules 110 that may be used in a preferred embodiment of the claimed invention. For example, many types of attack mitigation modules 110 are configured to detect a flood-type DoS attack, or DDoS attack. Some modules 110 perform this type of detection by using statistical analysis on data packets $D_{in}$ received from the network 10 to determine when the data packets vary from normal network traffic. Normal network traffic is determined based on observations of network traffic for a particular network. Thresholds for abnormal network traffic may be established based upon the observations and upon a balance between security level and false positive indications. An appropriate balance must be selected since a lower threshold will likely result in higher security, but may cause more false positive indications of an attack. On the other hand, a higher threshold can result in lower security, but with fewer false positive indications.

Preferably, after establishing the thresholds, the attack mitigation module 110 statistically analyzes the network traffic to determine when the traffic exceeds the thresholds. In this embodiment, if the traffic exceeds the thresholds, an attack is detected. After an attack is detected, countermeasures can be initiated to block data packets from a specific IP address. Additionally, countermeasures can be initiated to block data packets to or from a common port, data packets having a common protocol, and/or data packets having the same target or destination IP address.

In some attack mitigation modules 110, a hash (or reduction) function is performed on the data packets, the results of which are sorted in a hash table. In such an embodiment, if the standard deviation of the entries in the hash table meets a threshold value, then a network attack is detected.

Preferably, some attack mitigation modules 110 can monitor a parameter value, such as the protocols or protocol flags of network data packets. These modules preferably construct a histogram of the parameter value, and compare the histogram to a threshold value. In such an embodiment, if a portion of the histogram exceeds the threshold, then a network attack is detected.

Another preferred attack mitigation module 110 monitors the ratio of data packets received and sent to a single computer. If the ratio exceeds a threshold value, then a network attack is detected. Alternatively, the attack mitigation module 110 may monitor, for example, the ratio of traffic from a first computer (e.g., 20a), to a second computer; e.g., 80b), over the traffic from the second computer 80b to the first computer 20a. If the ratio exceeds a threshold value, then an attack may be detected, and the traffic between the first computer 20a and second computer 80b may be discarded.

In another aspect of a preferred embodiment, another attack mitigation module 110 determines whether the attack was initiated from a single source computer 20a, or determines whether data packets included in an attack have a common port or protocol. If the attack was initiated from a single source computer 20*a*, then all data packets having the same attacking source IP address can be discarded. Additionally, if the attack was initiated by data packets having a common port or protocol, then all data packets having the common port or protocol can be discarded. Preferably, the attack mitigation modules 110 use other identifying information, such as the destination address, the destination port, or the content of the data packet itself, to determine whether a data packet should be discarded.

Additionally, in another preferred attack mitigation module 110, the module detects an attack by determining whether a number of duplicate GET commands have been received that exceeds a threshold value. If the threshold value is exceeded, then the duplicate packets are discarded. This module is described in more detail below.

Yet another preferred attack mitigation module 110 detects an attack by determining whether a user agent header entry in a packet header of a received data packet contains an alphabetical character. If an alphabetical character is not detected, the data packet is discarded. This module is described in more detail below.

Still another preferred attack mitigation module 110 detects an attack by determining whether a host value header entry exists in a packet header of a data packet. If the host value header entry does not exist, the data packet is discarded. This module is described in more detail below.

In yet another preferred embodiment, the attack mitigation module 110 keeps a blacklist of source addresses. The blacklist is created, for example, from prior recorded attacks. If a received data packet, $D_{in}$, contains a source address that is a member of the black list, the packet is blocked or discarded. In this regard, as attacks get more sophisticated, the attackers are able to modify the source address in the attacking data packets. However, even after changing the source addresses, many of the attacks use data packets that have not changed the source server or sub-network. The blacklist also tracks suspect servers or sub-networks. In one preferred embodiment, the attack mitigation module 110 discards data packets from a server or sub-networks if, for example, more than a threshold number of attacks have originated from the server or sub-network within the past year. It should be noted that any time period might be used, however, for such a determination.

Preferably, the attack mitigation modules 110 produce a volume of data that is free of data causing the attack, called clean data, or $D_{out}$, herein, for sending to the one or more second computers 80*a*, 80*b*, 80*c* and 80*d*. The amount or volume of the clean data is measured as $D_{out}$ over a time period, $P_{out}$.

The data cleaning center 100 may optionally include a distribution router 112, which provides a backbone or clean pipe to other data cleaning centers 100*a*, 100*b*, 100*c* and 100*d* following processing by the attack mitigation modules 110. Preferably, the backbone uses a high-speed connection 158 to directly connect each data cleaning center 100, 100*a*, 100*b*, 100*c* and 100*d*. Providing a connection to other data cleaning centers 100*a*, 100*b*, 100*c* and 100*d* allows two or more data cleaning centers to share and distribute processing. For example, some data cleaning centers have updated attack mitigation modules 110 that preferably are remotely accessed by other data cleaning centers that have not been updated.

Further, if a particular data cleaning center 100 has one or more subsystems that fail, such as one or more attack mitigation modules 110, then the attack detection and/or mitigation function may be outsourced to a fully functioning data cleaning center through the distribution router 112. Moreover, if one data cleaning center 100*a* is overwhelmed by one or several large attacks, processing of the one or more attacks may be load balanced across the backbone 158 to distribute processing across the other data cleaning centers 100, 100*b*, 100*c* and 100*d*.

Preferably, after the received data, $D_{out}$, is processed to produce the clean data, $D_{out}$, the next task is to provide the clean data, $D_{out}$, to one or more proxy servers 116. In one preferred embodiment, the proxy servers provide a reverse proxy function to the one or more second computers 80*a*, 80*b* 80*c* and 80*d*. In this case, the second computers 80*a*, 80*b*, 80*c*, and 80*d* comprise server computers. As is typical, the proxy servers 116 provide added protection to the second computers 80*a*, 80*b* 80*c* and 80*d* that are server computers. For example, a firewall may be included in a proxy server 116 that is specific to the target server. Further, a server may also use two or more of the proxy servers 116 to provide load balancing.

In this regard, load balancing of all of the proxy servers 116 is preferably provided using a load balancing apparatus 114. The load balancing apparatus 114 may include, by way of example only, and not by way of limitation, a RADWARE WSD™ device produced by Radware, Inc. of Mahwah, N.J., a JUNIPER™ M series device produced by Juniper Networks, Inc. of Sunnyvale, Calif. Any other similar device may also be used.

In one embodiment, two or more of the load balancing systems 114 are provided so that different types of systems are available for matching with the proxy servers 116 depending on specific requirements. For example, software-based load balancing systems 114 tend to be less expensive, but slower, than hardware-based load balancing systems 114. Further, a particular sever computer 80*b* may, for example, only require that the slower software-based load balancing system 114 is used because the server 80*b* has a lower throughput of clean data, $D_{out}$, than another server 80*c*, which requires a faster, hardware-based, load balancing system 114 because of its higher usage.

One or more of the attack mitigation modules 110 may be located in, or execute on, each of the proxy servers 116. It is preferable, for example, for those mitigation modules 110 that execute on the application layer to reside in the proxy servers 116 after the network layer packet headers have been stripped. For example, the mitigation module 110 that checks for duplicate GET commands is preferably located on each of the proxy servers 116.

After the clean data, $D_{out}$, is routed through the proxy servers 116, it is processed by the core router 108 for forwarding to their destination over the network 10. The meter 104 takes a measurement of the clean data, $D_{out}$, as it is routed out to the core edge aggregation router 102, which processes the clean data, $D_{out}$, for distribution through the network 10.

In one embodiment, while the meter 104 performs the task of measuring $D_{in}$ and $D_{out}$, the meter 104 further compares the measurements to determine whether an attack has been mitigated by the attack mitigation modules 110. For example, the meter 104 may determine that such an attack directed toward one or more of the second computers 80*a*, 80*b*, 80*c* and 80*d* has been mitigated if $D_{out}$ divided by $P_{out}$ is substantially less than $D_{in}$ divided by $P_{in}$.

In preferred embodiments of the claimed invention, there is flexibility with regard to this implementation of the detection method. For example, in most embodiments, wherein the time periods $P_{in}$ and $P_{out}$ are long enough (e.g., 10 seconds), the measurement of the data $D_{in}$ and $D_{out}$ occurs during the same time interval, wherein the start of time periods $P_{in}$ and $P_{out}$ are concurrent. In these embodiments, any latency, L, that occurs in the one or more data mitigation modules 110, proxy servers 116, or other modules within the data cleaning center 100, would be a matter of microseconds. Accordingly, any difference in the measurement of $D_{in}$ and $D_{out}$ caused by the latency, L, would be relatively minimal when compared to the data throughput of the data cleaning center 100.

However, in configurations wherein the time periods $P_{in}$ and $P_{out}$ are closer in duration to the latency period, L, for processing of the received data, $D_{in}$, the latency period, L, is preferably taken into account in the detection method. In these configurations, it may be desirable to measure $D_{in}$ and $D_{out}$ over two different, but equal, time periods, $P_{in}$ and $P_{out}$, to account for the latency, L, for processing of the received data $D_{in}$ by the attack detection and/or mitigation modules. More specifically, the time period, $P_{out}$, has a start time that occurs after the start time of $P_{in}$ plus a latency time period, L, for processing of the received data, $D_{in}$, by the attack detection and/or mitigation modules. Typically, the latency period, L, is calculated by using historical averages for processing the received data $D_{in}$ by the attack detection and/or mitigation modules 110, or other sub-systems within the data cleaning center 100.

Another variable in the implementation of the detection method is the measure of the value of "substantially less" with regard to the comparison of $D_{out}$ divided by $P_{out}$ and $D_{in}$ divided by $P_{in}$. For example, in one embodiment, the measure of what is "substantially less" to determine if an attack is occurring may be an almost absolute measurement. Specifically, $D_{out}$ divided by $P_{out}$ may be deemed substantially less than $D_{in}$ divided by $P_{in}$ if ($D_{in}$ divided by $P_{in}$) minus ($D_{out}$ divided by $P_{out}$) is greater than 0, plus or minus a number of megabits in high-throughput systems.

However, in another embodiment, $D_{out}$ divided by $P_{out}$ may be considered to be substantially less than $D_{in}$ divided by $P_{in}$ if ($D_{in}$ divided by $P_{in}$) minus ($D_{out}$ divided by $P_{out}$) is greater than a specified threshold value. Preferably, the threshold value is determined from historical averages of differences between the values of the received data, $D_{in}$ divided by $P_{in}$, and the clean data, $D_{out}$ divided by $P_{out}$, during normal, non-attack time, operations. The differences in the values may be due to processes in the system such as caching or the like. In this embodiment, the use of the threshold value may also provide a method for taking latency, L, into account in the determination as to whether there is an attack.

In another preferred embodiment, some of the data $D_{in}$ received from the one or more first computers 20a, 20b and 20c is cached after it is cleaned. Subsequently, as is typical in many networked systems, a portion of the received data $D_{in}$ is the same as, or the duplicate of, previously received data $D_{in}$. If the cleaned version, $D_{out}$, of the received data is in the cache, then the cached clean data, $D_{cache}$, is sent to the one or more second computers 80a, 80b, 80c and 80d in lieu of a portion of the received data, $D_{in}$. In this embodiment, the cache is mathematically taken into account in determining the meaning of "substantially less." Specifically, the system determines that $D_{out}$ divided by $P_{out}$ is substantially less than $D_{in}$ divided by $P_{in}$, if (($D_{out}$ plus $D_{cache}$) divided by $P_{out}$) is less than ($D_{in}$ divided by $P_{in}$). As described above, if the result is a non-zero value, a threshold value is used in this embodiment to compare to the result to allow for non-attack condition variances before an attack is determined to have been detected.

In another embodiment, the time periods for $P_{in}$ and $P_{out}$ do not necessary have to be equal in length, as the comparison of the received data, $D_{in}$, and clean data, $D_{out}$, is normalized due to the division by the relative time periods, $P_{in}$ and $P_{out}$, to provide megabit per second (Mbit/sec) ratios that can be compared. Also in this embodiment, a threshold value is used in the comparison of the ratios to take into consideration non-attack condition fluctuations in data rates.

In one embodiment, the meter 104 is more passive and merely records the measurements of $D_{in}$ over $P_{in}$ and $D_{out}$ over $P_{out}$. Further, it may be preferable to provide for remote access by a network device, such as a client computer or workstation 90, to the data cleaning center 100 to perform any other calculations necessary to determine if an attack is occurring. In this embodiment, the remote workstation 90 comprises a standard personal computer or notebook with access to the network 10. Using the workstation 90, components of the data cleaning center 100 are preferably accessed through a secure connection using known encryption techniques. Specifically, the remote workstation 90 may read measurements taken by the meter 104 to perform the determination of whether an attack is occurring. Using such a workstation 90 provides the added advantage of allowing the measurements from the meter 104 to be downloaded, stored, and manipulated in various statistical software packages, such as EXCELL™ by the Microsoft Corp., or OPENVIEW™ by the Hewlett-Packard Development Company, L.P.

In one embodiment, an alert apparatus is provided either as a part of the meter 104 or the remote workstation 90, to provide an alert if an attack is detected and/or mitigated. Preferably, the alert apparatus provides, by way of example only and not by way of limitation, an electronic mail alert, an audible alert, a visible alert, or the like.

Figure 2:
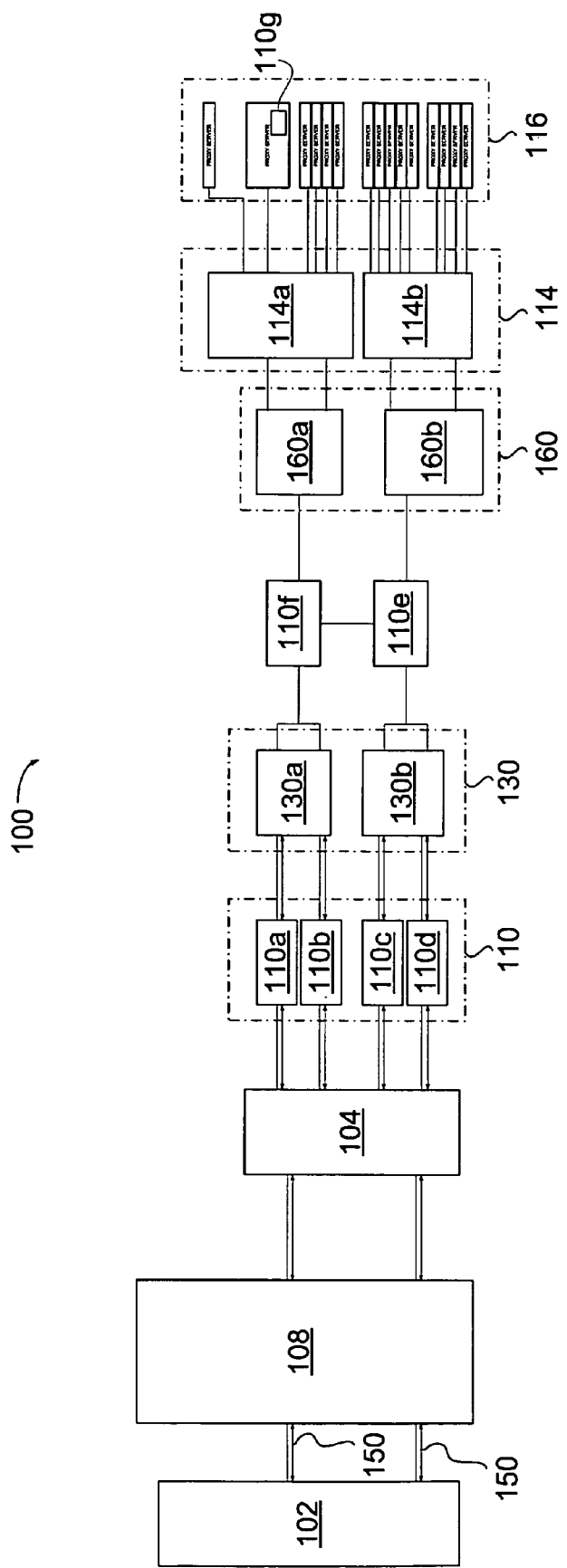
FIG. 2 is a block diagram illustrating packet switching flow through various hardware components of the data cleaning center according to another exemplary embodiment.

Referring now to FIG. 2, a schematic block diagram of various hardware components of the data cleaning center 100 are shown according to another preferred embodiment. The data, $D_{in}$, is received by the core edge router 102. Such a core edge router 102 may comprise a JUNIPER M40™ router produced by Juniper Networks of Sunnyvale, Calif. Any similar device may also be used. The core edge router 102 performs the task of filtering the incoming data packets, $D_{in}$, which comprises the discarding of all packets using UDP or ICMP protocols. In some instances, one of the second computers being protected by the data cleaning center 100 may require reception of UDP or ICMP packets. In those instances, an administrator at the data cleaning center 100 sets the core edge router 102 so that UDP or ICMP data packets received for the particular second computer are allowed to pass through the data cleaning center 100. Nevertheless, the attack mitigation modules 110 described herein can sufficiently protect the second computer 80 receiving UDP and ICMP packets from various attacks.

Preferably, the core router 108 is, by way of example only, a BIG IRON™ 4000 router available from Foundry Networks of San Jose, Calif., which provides network layer three packet switching. In some embodiments, more than one router is used to perform the functions of the core router 108. For example, one BIG IRON™ 4000 system may be used to process the received data, $D_{in}$, and another may be used to process the clean data, $D_{out}$.

From the core router 108, the received data, $D_{in}$, may pass through the meter 104. In one preferred embodiment, the meter 104 comprises, by way of example only, a NET IRON 800™ monitor, which provides a gigabit layer three switch that can monitor the received data, $D_{in}$. As stated above, the meter 104 also may be configured to monitor the clean data, $D_{out}$ that is outgoing back to the network 10 after passing through the other components of the data cleaning center 100. In this way, the meter 104 provides a "mirrored image" observation of data $D_{in}$, being received by the data cleaning center, and the corresponding clean data, $D_{out}$, being produced by the data cleaning center 100.

In one preferred embodiment, over and above the measurement of $D_{in}$ verses $D_{out}$, the NET IRON 800™ performs some of the functions of the data mitigation modules 110. For example, a SYN-flood attack detector may be included in the meter 104. The meter 104 sorts and counts the received data packets, $D_{in}$, according to their sources and destinations, and count the number of packets marked with an "S" for send packets verses the number of other types of packets over the same period of time, $P_{in}$, such as acknowledge (ACK) packets. If the number of send packets over other types of packets is more than a threshold, for example, 20% more, then a possible attack may have been detected, and an alert may be provided by the alert apparatus.

In some situations, however, it is preferable to use dedicated computer hardware systems on the local fiber network 150 to perform the attack detection and/or mitigation functions. For example, one of the attack mitigation modules 110 may comprise, by way of example only, and not by way of limitation, an ATTACK MITIGATOR IPS 2800™ or ATTACK MITIGATOR IPS 5500™, which are each available from Top Layer Networks of Westborough, Mass. The ATTACK MITIGATOR IPS 5500™ blocks HTTP worms and other hybrid threats, using advanced "normalized" deep packet and multi-packet HTTP URL matching and wildcard checking, and is pre-configured to identify hundreds of HTTP URL exploits, including DoS and DDoS attacks, and trojan horses.

In another preferred embodiment, one ATTACK MITIGATOR IPS™ 5500 contains several or all of the attack mitigation modules 110. However, two or more of the ATTACK MITIGATOR IPS 5500™s, shown as 110a, 110b, 110c and 100d in FIG. 2, are duplicated in the local fiber network 150 to allow load balancing to provide higher output. Open Shortest Path First (OSPF) routing protocol also may be used, and is able to determine if a link to an attack mitigation module 110a or 110b in the local fiber network 150 is down, so that the received data, $D_{in}$, may be re-routed to other attack mitigation modules 110c or 110d performing the same function.

Another router 130 may be used to re-aggregate the load balanced data, $D_{in}$, which, for the most part, is characterized as clean data, $D_{out}$, when it reaches the router 130. Another NET IRON 800™, or NET IRON 400™ offered from the same manufacturer, may be used to perform this function. In some embodiments, the router 130 may comprise an aggregate of several routers 130a and 130b.

Optionally, further attack mitigation modules 110e and 110f are used after re-aggregation of the data. For example, the attack mitigation modules 110e and 110f preferably comprise available firewall systems to further ensure that the data, $D_{out}$, is free of data packets sent as part of an attack. If the firewalls 110e and 110f are load balanced, then a router 160, such as a NetIron 800 or 400 may be used to re-aggregate the data. In higher volume systems, the re-aggregation process may be split between two or more routers 160a and 160b.

After the clean data, $D_{out}$, is re-aggregated, it is ready to be load balanced and apportioned to proxy servers 116. In the embodiment shown in FIG. 2, the load balancing apparatus 114 comprises a cluster of load balancing systems 114a and 114b. In one embodiment, each load balancing system of the cluster 114 comprises, by way of example only, one of the aforementioned RADWARE WSD™ devices, Foundry SERVER IRON™ devices, and Dell POWEREDGE™ devices. The brand selection of each of the load balancing devices 114a and 114b mainly depends on the number of proxy servers serviced by the device and the total throughput required. For example, some hardware-based systems, such as the RADWARE WSD™ device, operate faster than some software based systems, such as the Foundry SERVER IRON™ device.

Preferably, the clean data, $D_{out}$, is then transmitted over the local network 150 back to the core router 108, and then core edge router 102. The proxy servers 116 may be divided into clusters, wherein the proxy servers within each of the clusters are load balanced by one of the load balancing devices 114.

As described with respect to FIG. 1, one or more of the attack mitigation modules 110 may be executed on each of the proxy servers, as symbolically shown as 110g in FIG. 2.

In some embodiments, each and every component illustrated in FIG. 2 may either be combined into one processor or computer that has multiple processors, and/or software processors, to process the functions described above. In other embodiments, the processing for all, or at least some of, the components may be expanded across multiple hardware devices for processing in parallel. As an example, in some embodiments, only one load balancing device 114 may be required if only a few proxy servers 116 are needed in the data cleaning center 100. Further, the proxy servers 116 may be combined into one multiplexing device that provides proxy services for several servers.

Methods Performed by the Data Cleaning Center

Figure 3:
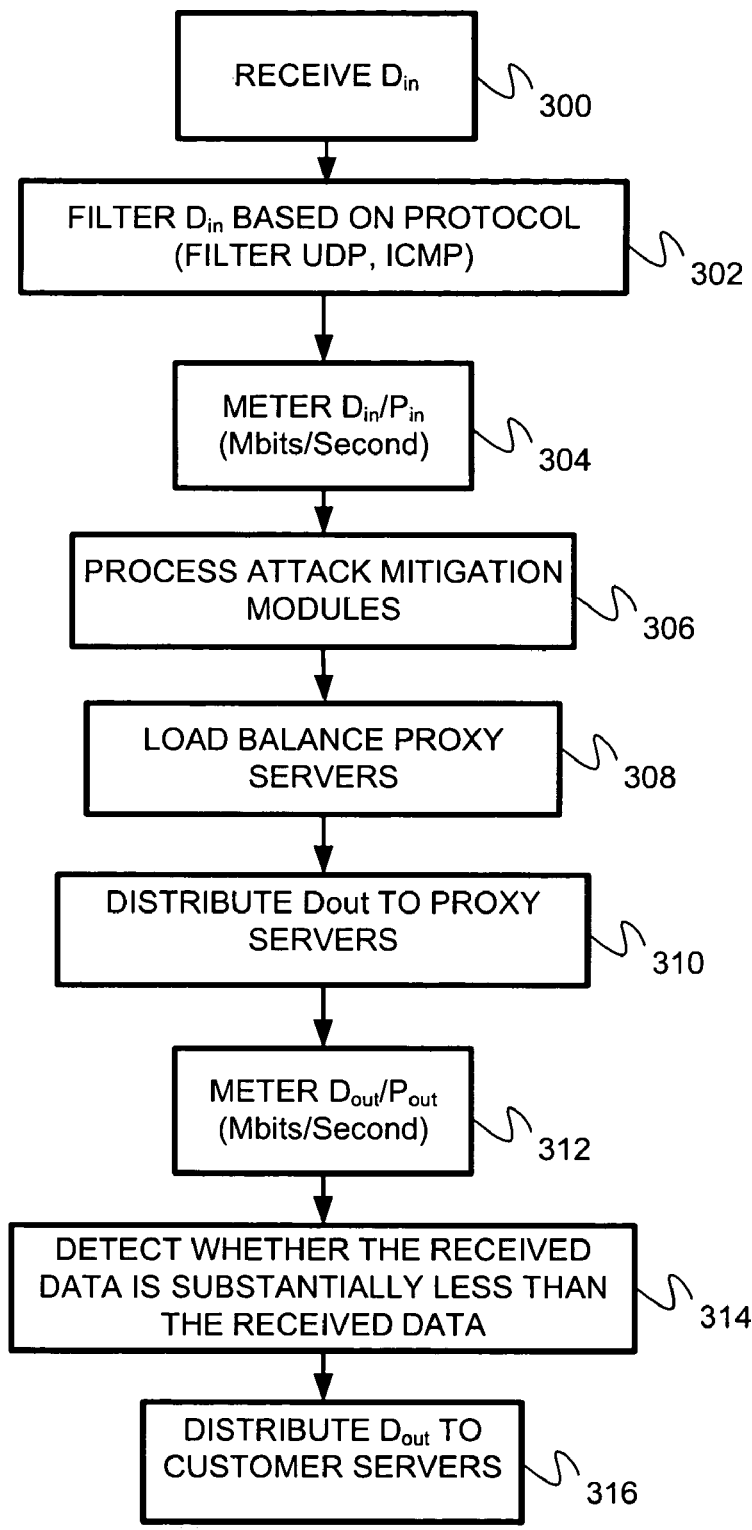
FIG. 3 is a flow diagram illustrating the steps performed by one or more embodiments of the data cleaning center.

Referring now to FIG. 3, a flow diagram is shown that illustrates the steps performed by one or more exemplary preferred embodiments of the data cleaning center 100. Specifically, the flow diagram illustrates the steps performed in a method for detecting and mitigating an attack, overload condition, or attempted overload condition (collectively referred to as an "attack") that may originate from one or more first computers, targeting one or more of a plurality of second computers located on a network. A volume of data, $D_{in}$, is received over a time period, $P_{in}$, from one or more first computers located on a network, step 300. The data packets of the received data, $D_{in}$, is filtered to discard data packets using UDP and ICMP protocols, with the exception that the UDP and ICMP packets directed to destination addresses requiring those protocols are not discarded, step 302. The remaining received data packets, $D_{in}$, are measured by the meter over a time period, $P_{in}$, step 304.

The received data packets, $D_{in}$, are processed through the attack mitigation modules to detect and mitigate the attack, step 306, to produce a volume of clean data, $D_{out}$, over a time period, $P_{out}$, wherein the time period, $P_{out}$, may be equal to the time period, $P_{in}$. The clean data, $D_{out}$, is load balanced, step 308, and processed by the proxy servers, step 310. The clean data, $D_{out}$, over the time period, $P_{out}$, is measured, step 312. The presence or absence of the attack targeting the one or more second computers is determined by calculating whether $D_{out}$ divided by $P_{out}$ is substantially less than $D_{in}$ divided by $P_{in}$, step 314. Finally, the clean data, $D_{out}$, is distributed over the network to the one or more second computers, step 316.

Figure 4:
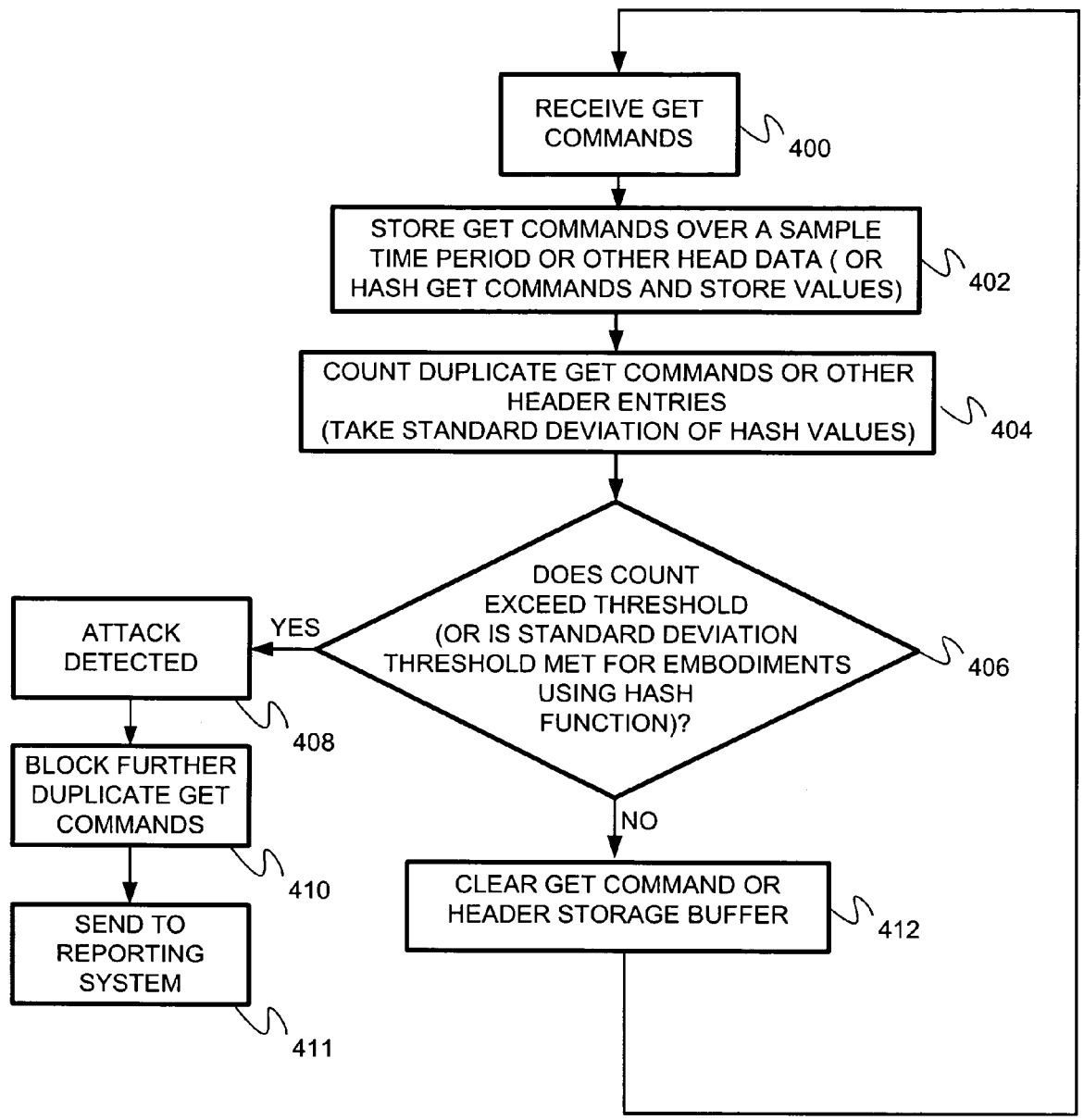
FIG. 4 is a flow diagram illustrating a method performed by one exemplary embodiment of an attack mitigation module for detecting an attack based on whether a suspect number of duplicate GET commands are received over a sample time period.

Referring now to FIG. 4, a preferred embodiment method is shown of an attack mitigation module for detecting an attack, based on whether a suspect number of duplicate GET commands, or commands requesting the same information, are received from one or more first computers targeting one or more second computers on a network over a sample time period. However, it should be noted that duplicates or patterns in the header may also be detected by this method.

The attack mitigation module may be included for use in a data cleaning center protecting a plurality of computer systems, such as that shown in FIG. 1. Preferably, the method of FIG. 4 is executed on each of the proxy servers (116 of FIG.

1). However, the attack mitigation module may be used in a stand-alone device or computer system on the network to protect one or a few server computers, and may be implemented in software, hardware, or in a programmable logic chip, such as an application specific integrated circuit (ASIC), field programmable gate array (FPGA), or the like.

A network connection (e.g., the network edge router of FIG. 1), receives a plurality of data packets, wherein many of the data packets may comprise GET commands, from the one or more first computers located on the network, step 400. Each GET command is stored in a database for a period of time, step 402, which is preferably determined according to a statistical history of the length of time needed to collect a sufficient number of GET commands to sample, and the capacity of the storage device used to store the GET commands. For example, for a system processing up to 10 gigabits per second, and having a network storage device with a capacity of two or more hundred gigabytes set aside for the attack mitigation module's storage, the sample period to store GET commands may easily be 10 seconds, without taxing the system.

The attack mitigation module counts the number of duplicate GET commands that have been received and stored over the sample period, step 404. If the number of duplicate GET commands exceeds a threshold value, step 406, the attack mitigation module may deem an attack to have been detected, step 408. In this embodiment, the attack mitigation module blocks and discards any further duplicate GET commands received from the network, step 410. A message may be sent to a reporting system that alerts an administrator that a GET-flood type attack may be underway, step 411. The message may be in the form of, without limitation, an electronic mail, voice mail, or an audio or visual alert on an administrator's computer system.

Alternatively, if the threshold is not exceeded, the stored GET commands are cleared from storage, step 412, and processing moves back to step 400. In some embodiments, not all of the GET commands are captured and stored over the sample period, but a statistically relevant number of sampled GET commands are copied and stored in order to save on processing time and storage.

Still, in other embodiments, in order to save storage space and processing time, a hash, or reduction, function may be performed on each of the GET commands, the results of which are stored and sorted into a hash table in step 402. The hash function may reduce each GET command to a smaller amount of data for evaluation. If the standard deviation of the entries in the hash table, measured in step 404, meets a threshold value, which is checked in step 406 (for being lower in some embodiments, or higher in other embodiments), then a network attack may be detected.

Figure 5:
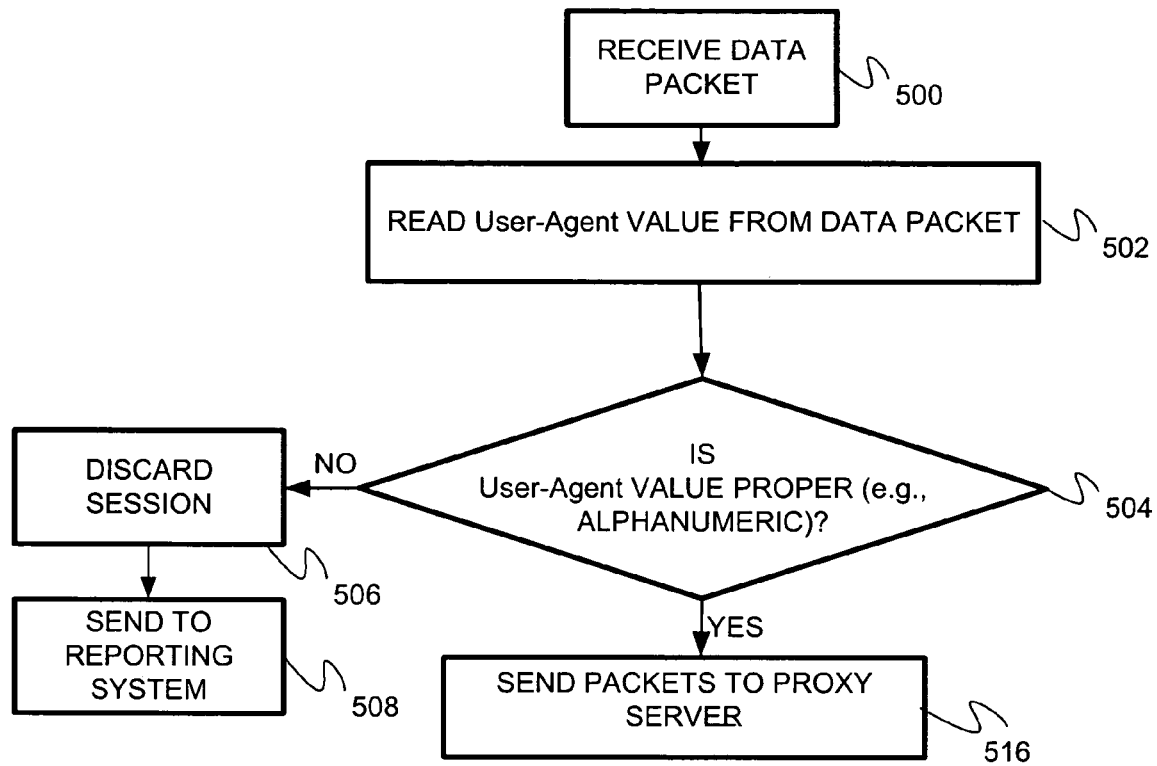
FIG. 5 is a flow diagram illustrating a method performed by one exemplary embodiment of an attack mitigation module for detecting and/or mitigating an attack by discarding data packets that have packet headers with a suspect user agent entry.

Referring to FIG. 5, a flow diagram is shown that illustrates a method performed by one preferred embodiment of an attack mitigation module for detecting and/or mitigating an attack by discarding data packets that have packet headers with a suspect user agent, or User-Agent, entry. The attack mitigation module may be included for use in a data cleaning center protecting a plurality of computer systems, such as that shown in FIG. 1. Preferably, the method of FIG. 5 is executed on each of the proxy servers (116 of FIG. 1). However, the attack mitigation module may be used in a stand-alone device or computer system on the network to protect one or a few server computers, and may be implemented in software, hardware, or in a programmable logic chip, such as an ASIC, field programmable gate array (FPGA), or the like.

In standard Internet HTTP protocol, each data packet received has a header portion, having a user agent entry. When the attack mitigation module receives a data packet, step 500, it reads the user agent entry, step 502. It next determines whether the user agent entry contains a proper value, step 504. For example, a proper user agent header entry may resemble the following sample:

User-Agent: Mozilla/4.0 (compatible; MSIE 6.0; Windows NT 5.0)

In most cases, an improper user agent entry is one that does not contain an alphabetical character. Many viral or other types of attacks on network systems send data packets that have non-alphabetical, or sometimes blank, user agent entries.

If the entry is improper, the session from which the data packet was sent is discarded or ended, step 506. A reporting system may alert an administrator that there was a potential attack, step 508.

If the User-Agent value is proper, then the session is not discarded, and if no other attack mitigation modules prevent processing, the proxy server processes the packets in the session, step 516.

Figure 6:
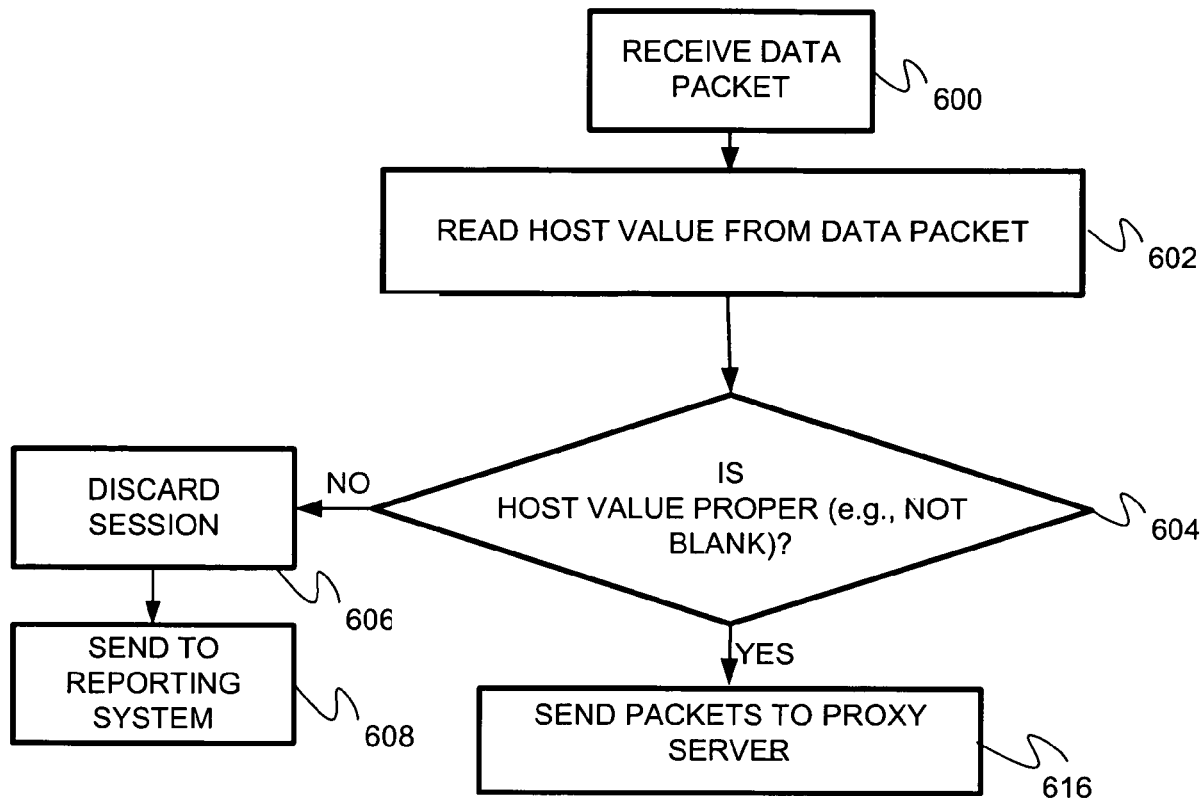
FIG. 6 is a flow diagram illustrating a method performed by one exemplary embodiment of an attack mitigation module for detecting and/or mitigating an attack by discarding data packets that have packet headers with suspect host value entries.

As shown in FIG. 6, a preferred embodiment method of an attack mitigation module that detects and/or mitigates an attack is performed by discarding data packets that have packet headers with suspect host value entries. Preferably, the attack mitigation module is included for use in a data cleaning center protecting a plurality of computer systems, such as that described in FIG. 1. Preferably, the method of FIG. 6 is executed on each of the proxy servers (116 of FIG. 1). However, the attack mitigation module may be used in a stand-alone device or computer system on the network to protect one or a few server computers, and may be implemented in software, hardware, or in a programmable logic chip, such as an ASIC, field programmable gate array (FPGA), or the like.

In standard Internet HTTP protocol, each data packet received has a header portion, having a host value entry. The host value entry is required by HTTP protocol to represent the naming authority of the origin server or gateway given by the original uniform resource locator (URL). This allows the origin server or gateway to differentiate between internally-ambiguous URLs, such as the root "/" URL of a server for multiple host names on a single IP address.

When the attack mitigation module receives a data packet, step 600, it reads the host value entry, step 602. It next determines whether the host value entry contains a proper value, step 604. For example, a proper user host value header entry may resemble the following sample:

*Host="Host" ":" host [":" port]*

In most cases an improper host value entry is one that is blank. Many viral or other types of attacks on network systems send data packets, which have blank host value entries.

If the entry is improper, the session from which the data packet was sent is discarded or ended, step 606. A reporting system may alert an administrator that there was a potential attack, step 608.

If the host value entry is proper, then the session is not discarded, and if no other attack mitigation modules prevent processing, the proxy server processes the packets in the session, step 616.

Figure 7:
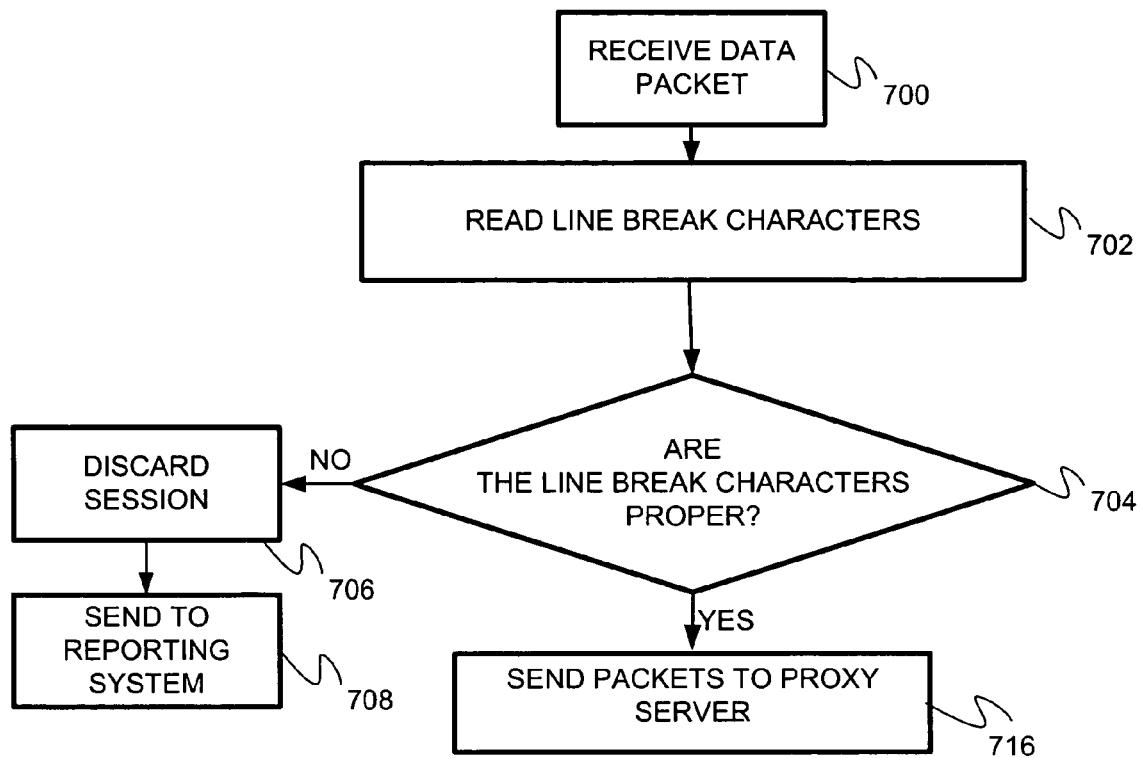
FIG. 7 is a flow diagram illustrating a method performed by one exemplary embodiment of an attack mitigation module for detecting and/or mitigating an attack by discarding data packets that use improper end-of-line or return characters.

Referring now to FIG. 7, a flow diagram is shown that illustrates a method performed in one exemplary embodiment of an attack mitigation module for detecting and/or mitigating an attack by discarding data packets that use improper end-of-line or return characters. Preferably, the attack mitigation module is included for use in a data cleaning center protecting a plurality of computer systems, such as that described in FIG. 1. Preferably, the method of FIG. 7 is executed on each of the proxy servers (116 of FIG. 1). However, the attack mitigation module may be used in a stand-alone device or computer system on the network to protect one or a few server computers, and may be implemented in software, hardware, or in a programmable logic chip, such as an ASIC, field programmable gate array (FPGA), or the like.

In standard Internet HTTP protocol, the structures of data packets are required to include full control-return (CR) and linefeed (LF) characters. The standard specifically states that a bare CR or LF should not be substituted for a full CRLF within any of the HTTP control structures. Web browsers must send CRLF as a line break indicator under the standard. If the session does not use CRLF, the session is rejected.

When the attack mitigation module receives a data packet, step 700, it reads the line break characters, step 702. It next determines whether the line break characters are proper, step 704. In most cases an improper line break character is one that is merely a CR or LF, and not a full CRLF. Many viral or other types of attacks on network systems send data packets, which have merely CR or LF line breaks.

If a line break is improper, the session from which the data packet was sent is discarded or ended, step 706. A reporting system may alert an administrator that there was a potential attack, step 708.

If the host value entry is proper, then the session is not discarded, and if no other attack mitigation modules prevent processing, the proxy server processes the packets in the session, step 716.

Clean Data Redirection

Referring again to FIG. 1, with some applications of the data cleaning center, the latency involved in using proxy servers to proxy every data packet that is sent from a first computer (e.g. 20c) to a second computer (e.g. 80a) may slow down communications between the first computer 20c and the second computer 80a. When the first computer 20c and second computer 80a are physically within the same region of the world on the Internet, the latency involved in using the proxy servers 116, or any proxy server, within the same region may not add very much relevant communication time.

However, there is a unique problem that arises when, for example, the first computer 20c and the second computer 80a are located in the same region, for example in Australia, and the data cleaning center 100 is located in, for example, the United States. In this case, if the second computer 80a is a real-time processing server, the latency period required for each packet sent between the first computer 20c and the second computer 80a to be sent through a proxy server 116 in the data cleaning center, or any proxy server in the United States for that matter, could degrade performance of time-critical or real-time applications. However, administrators at the second computer 80a may still desire to take advantage of the attack protection system and methods of the data cleaning center 100.

Figure 8:
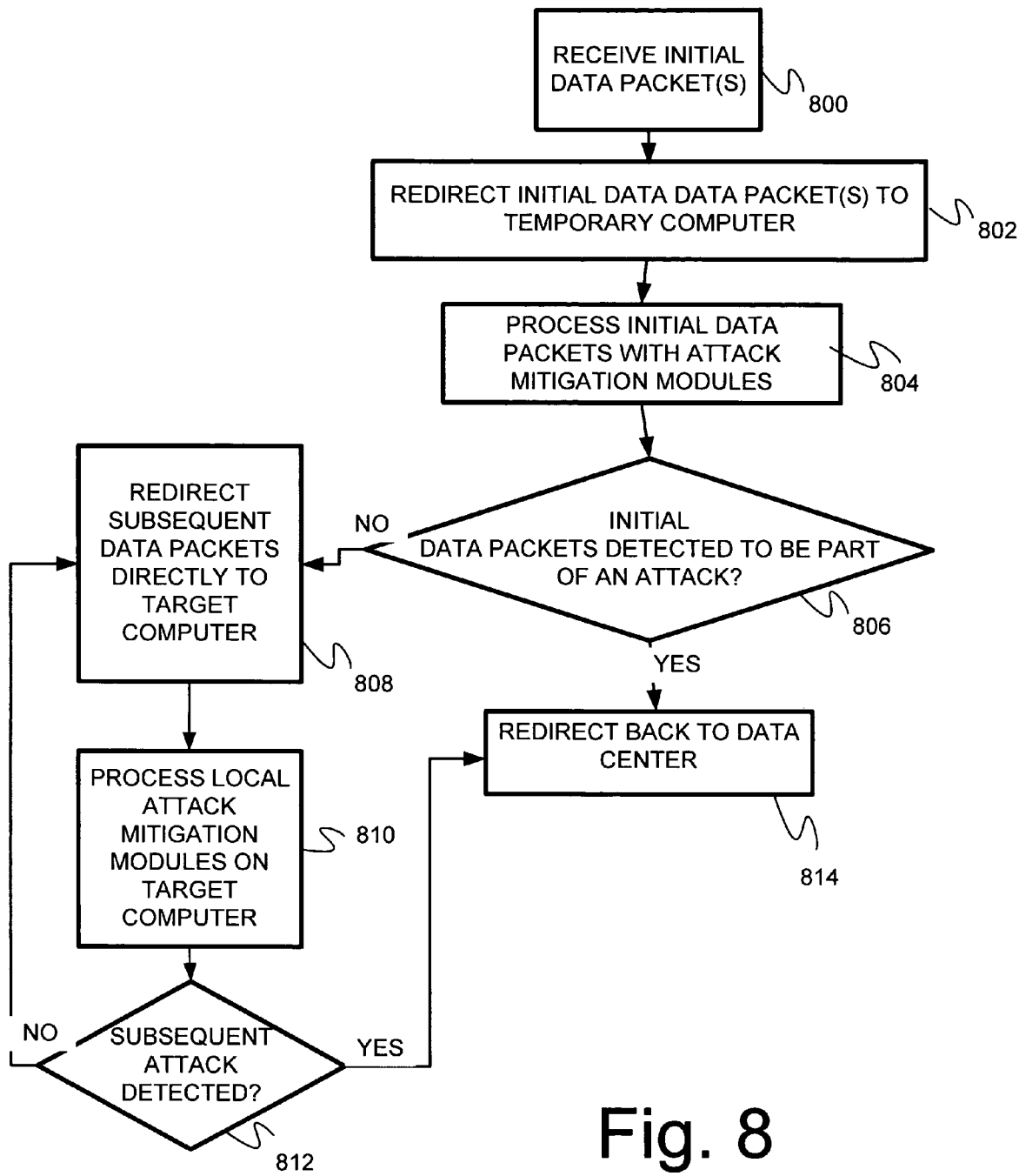
FIG. 8 illustrates a method for preventing an attempted overload condition targeting a networked computer system that lessens or eliminates the latency effect of using the data cleaning center, such as that illustrated in FIG. 1.

Referring now to FIG. 8, a method is shown for preventing an attempted overload condition targeting a networked computer system that lessens or eliminates the latency effect of using the data cleaning center (e.g., 100 in FIG. 1) to protect the second computer (e.g., 80a in FIG. 1). Just as is the normal case when the first computer (e.g. 20c in FIG. 1) requires access to the second computer, the data cleaning center may receive one or more initial data packets from the first computer for processing by a second computer, step 800. For example, the one or more initial data packets may comprise session initiating data packets so that the first computer may initiate contract with, and set up a session for using, the second computer.

In one embodiment, the data cleaning center redirects the first computers to send the one or more initial data packets to a third computer, step 802, which may comprise a proxy server (116 in FIG. 1) within or proximate to the data cleaning center, or another computer that may or may not be remote from the data cleaning center. The third computer is designated to receive traffic from the first computer until the first computer is verified not to comprise an attacking system.

The attack mitigation modules 110 process the initial data packets to determine whether the one or more initial data packets are legitimate, and not a part of, for example, an attack on the second computer, step 804. If the attack mitigation modules determine that the initial data packets are not a part of an attempted overload condition 110, step 806, then the first computer is redirected to send subsequent data packets directly to the second computer, step 808, thereby eliminating any latency that would be associated with continuing to process subsequent data packets in the data cleaning center.

With this embodiment and the use of the data cleaning center, there is concern that an attack may escape detection by delaying the attack until after the initial data packets are processed. In order to lessen this possibility, the second computer is configured with one or more local attack detection and/or mitigation modules that are at the least configured to detect such subsequent attacks, step 810. For example, a SYN-Flood mitigation module may be installed on the second computer, or a version of the data 100 center of FIG. 1 may be installed. If a subsequent attack is detected, step 812, then processing of all subsequent data packets is redirected back to the data cleaning center to use attack mitigation modules and proxy servers to clean the data before processing by the second computer, step 814.

In some embodiments, the domain name of the third computer has a different prefix than the domain name of the second computer. For example, the second computer may have a prefix of www, and the domain name of the third computer may have a prefix of wwwn, wherein n is a numeric value. This way, the main body of the domain name could be the same so that users do not become confused to think that they have been redirected to the wrong server computer.

In one preferred embodiment, the method of the attack mitigation module includes determining whether the initial data packets are a part of an attack. The attack mitigation module determines whether each received initial data packet is from a browser executing on the first computer. For example, this can be checked by attempting to write one or more cookies to the one or more first computers. Viruses running on the first computer, for example, sending data packets to the second computer currently do not have the ability to accept cookie files from the second computer. The failure to write the cookie file could indicate the initial data packets are a part of the attack, and the subsequent data packets should not be redirected to the second computer.

In another preferred embodiment, another way of determining whether the network connection has received the initial data packets from a browser executing on the first computer comprises presenting text, in a distorted image, or other human only readable test, to be typed into the one or more browsers by one or more users. An example of a human-only readable challenge is used, by way of example only, by Yahoo!, Inc. of Sunnyvale, Calif., in their user-mail registration systems. Other human-only readable challenges are also known (e.g., ticket master, and the like): If the second computer receives an incorrect response that does not satisfy the human-only challenge, or if there is no response at all, as would be the case with most viruses, then an attack could be indicated, and the subsequent data packets should not be redirected to the second computer.

DNS Attack Mitigation

Another preferred embodiment relates to a system and method for detecting and/or mitigating an attack targeting a domain name service (DNS) server. The DNS server may operate remotely from the system protecting it, as is the case with respect to one or more second computers described in FIG. 1. A pre-processing system for the DNS server is provided to absorb, to detect and to mitigate attacks. However, in some configurations, the DNS server may use its own protection system embodied in a separate processor connected between the network and the DNS server, or in a local processor embedded within the DNS server itself.

Figure 9:
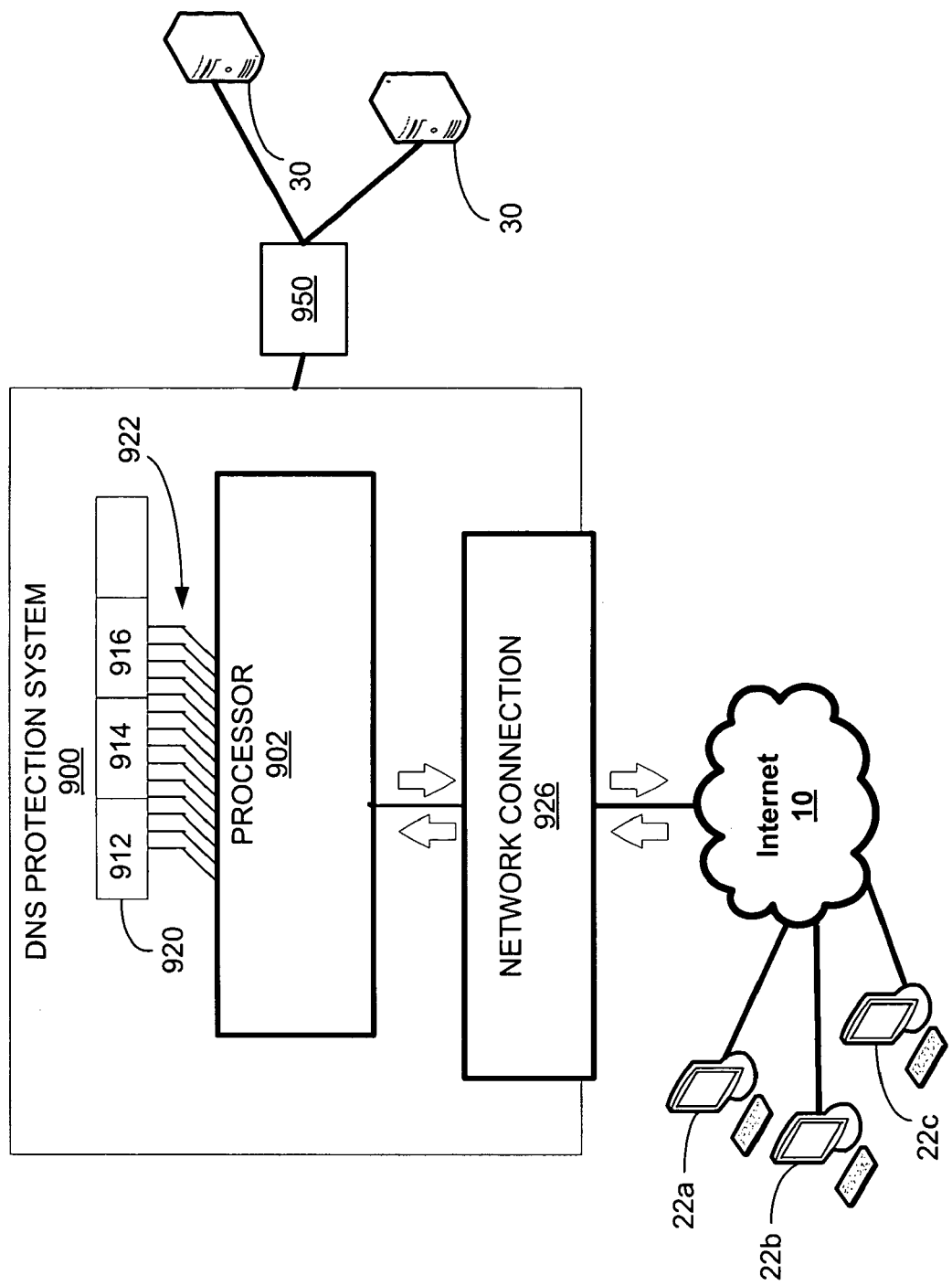
FIG. 9 is a block diagram of a DNS protection system according to an exemplary embodiment.

FIG. 9 illustrates an embodiment of the DNS server protection system 900 to protect a DNS server 30. A network connection 126 is provided for receiving one or more DNS requests from one or more client computers 22a, 22b and 22c located on the network 10. A preferred embodiment includes a processor 902, separate from that normally used by the DNS server 30, for providing a response for the one or more DNS requests to the one or more client computers 22a, 22b and 22c before or instead of normal processing by the DNS server 30.

In one embodiment, the processor 902 protects two or more load balanced DNS servers 30. A load balancing router 950 performs load balancing between the DNS servers 30.

Preferably, the added processor 902 monitors the volume of requests received per second to the DNS servers 30. If a threshold volume is detected, then processing of the DNS requests is diverted to the processor 902.

Figure 10:
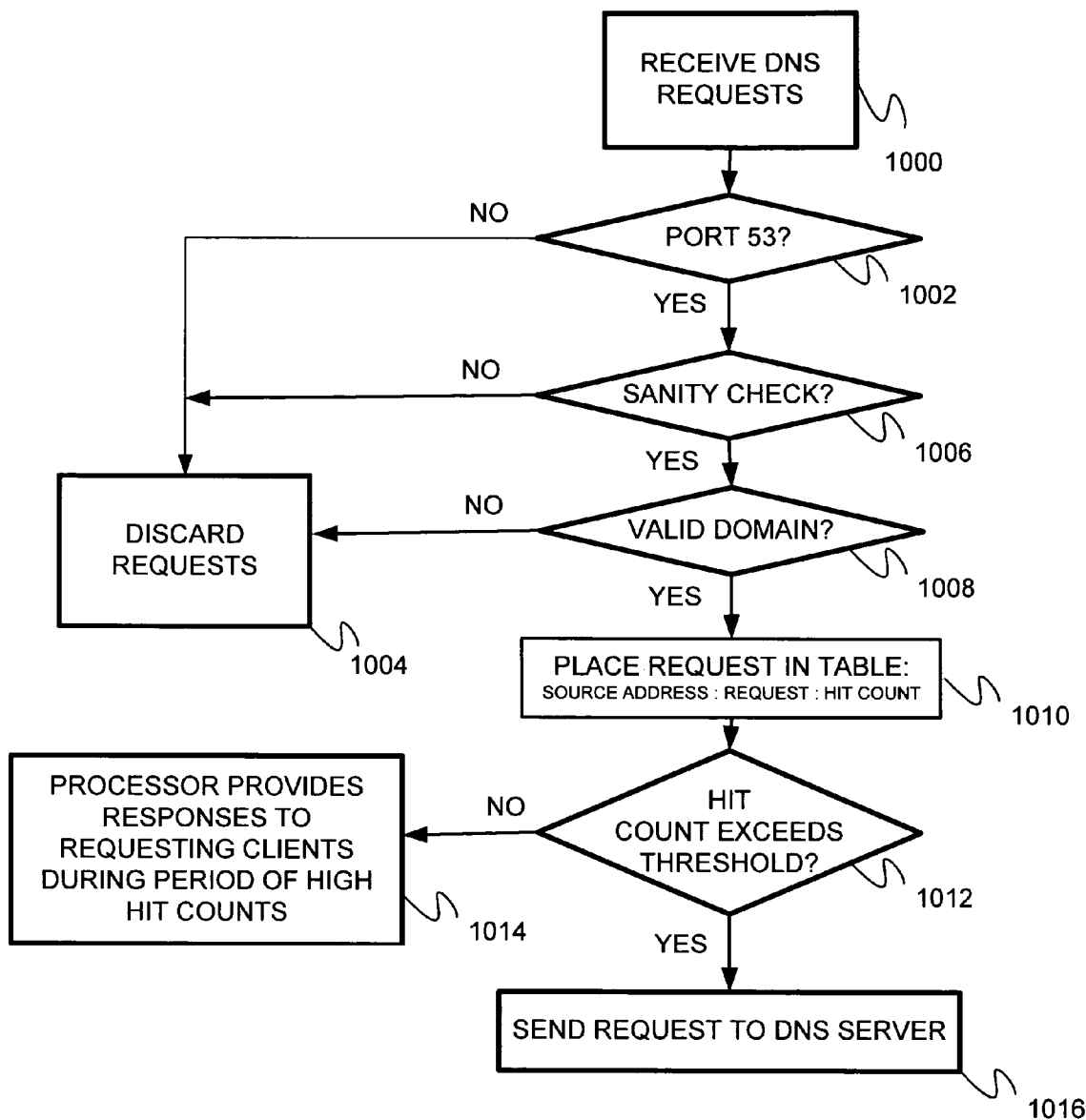
FIG. 10 is a flow diagram that illustrates a method preformed by the DNS protection system.

Referring now to FIG. 10, a flow diagram is shown that illustrates a preferred method preformed by the DNS protection system for detecting and/or mitigating an attack targeting the DNS server. One or more DNS requests are received from the one or more client computers located on a network, step 1000. The processor 902 checks for whether the request is directed to port 53, step 1002. All requests not directed to part 53 are discarded, step 1004. A sanity check is performed on the request, which determines whether DNS standard request requirements are met in the request, step 1006. Standards for DNS requirements may be found by contacting the Internet Engineering Task Force (www.IETF.org). Specifically, standards may be viewed in the request for comments (RFC) section of the IETF web site. If the request does not comply with DNS requirements, the request is discarded, step 1004.

Next, the processor 902 determines whether the request is for a domain name on a list of valid domain names for the DNS server, step 1008. If not, then the request is discarded, step 1004.

If the request is not discarded, the processor 902 places the request in a database, step 1010. The database may be keyed by the source address, and target domain name requested. Further, a hit count is kept in the database to count the number of (duplicate) requests for each source address and request.

The processor 902 checks for whether the recorded hit count for the request exceeds a threshold for the number of requests over a period of time (for example, over the last ten seconds), step 1212. The threshold is based on the capacity of the DNS sever(s) 30. If the threshold is exceeded, then the processor 902 itself services all requests for the particular source address and target domain requested until the hit count is reduced, step 1014. If necessary, the processor 902 makes a request to the DNS server 30 to obtain the IP address to answer the request. However, in one embodiment, the required information is kept in a memory in the DNS protection system 900.

Otherwise, if the hit count threshold is not exceeded, the DNS sever(s) 30 process the request directly, step 1016.

Referring again to FIG. 9, the processor 902 is preferably configured to execute instructions as fast as possible, given the size and speed of attacks that typically are to be handled by the processor. Thus, in a preferred embodiment, the instructions to respond to requests are built directly into the chip logic of the processor 902. The list of valid domain names may be stored in a database 912 in a high-speed memory 920 in the DNS protection system 900. The high-speed memory 920 is preferably connected to the processor 902 through a high-speed data bus 922 Further, the database of received requests and hit counts are stored in a sorted database 914 located in the high-speed memory 920.

A cache 916 of requests previously processed by the DNS server 30 may be stored in the memory 920 so that the processor 902 may perform step 1014 of FIG. 10 without the need to make a special request to the DNS server(s) 30.

It will be apparent from the foregoing that, while particular forms of the invention have been illustrated and described, various modifications can be made without departing from the spirit and scope of the invention. Accordingly, it is not intended that the invention be limited, except as by the appended claims.

The invention claimed is:

1. A system for detecting and mitigating an attempted overload condition targeting one or more of a plurality of networked computer systems, comprising:
   a network connection for receiving a volume of data, $D_{in}$, over a time period, $P_{in}$, from one or more first computers located on a network;
   one or more attack mitigation modules for detecting data, directed to one or more of a plurality of second computers located on the network, that bears one or more characteristics determined to be associated with attempted overload conditions, the attack mitigation modules producing a volume of clean data from which all of the data detected to be bearing one or more of the characteristics determined to be associated with attempted overload conditions has been removed, $D_{out}$, over a time-period, $P_{out}$, wherein the time period, $P_{out}$, is equal to the time period, $P_{out}$; and
   a meter for detecting the presence of a mitigated overload condition attempt when $D_{out}$ divided by $P_{out}$ is substantially less than $D_{in}$ divided by $P_{in}$;
   wherein the one or more attack mitigation modules function to remove the data detected to be bearing the one or more of the characteristics determined to be associated with attempted overload conditions at least at a time before the meter has detected the presence of the mitigated overload condition attempt.

2. The system of claim 1, wherein the network connection sends the clean data, $D_{out}$, to the one or more second computers.

3. The system of claim 2, wherein the network connection sends cached clean data, $D_{cache}$, to the one or more second computers in lieu of a portion of the received data, $D_{in}$.

4. The system of claim 3, wherein $D_{out}$ divided by $P_{out}$ is substantially less than $D_{in}$ divided by $P_{out}$, if (($D_{out}$ plus $D_{cache}$) divided by $P_{out}$) is less than ($D_{in}$ divided by $P_{in}$).

5. The system of claim 1, wherein the time period, $P_{in}$, has a start time, and the time period, $P_{out}$, has a start time, wherein the start time of $P_{out}$ occurs after the start time of $P_{in}$, plus a latency time period, L, for processing of the received data, $D_{in}$, by the attack mitigation modules.

6. The system of claim 1, wherein $D_{out}$ divided by $P_{out}$ is substantially less than $D_{in}$ divided by $P_{in}$ if ($D_{in}$ divided by $P_{in}$) minus ($D_{out}$ divided by $P_{out}$) is greater than a threshold value.

7. The system of claim 1, wherein $D_{out}$ divided by $P_{in}$ is substantially less than $D_{in}$ divided by $P_{in}$ if ($D_{in}$ divided by $P_{out}$) minus ($D_{out}$ divided by $P_{out}$) is greater than 0.

8. The system of claim 1, wherein the one or more first computers include one or more user computers.

9. The system of claim 1, wherein the one or more second computers include one or more server computers.

10. The system of claim 1, wherein the one or more first computers include one or more server computers.

11. The system of claim 1, wherein the one or more second computers include one or more user computers.

12. The system of claim 1, wherein the network comprises the Internet.

13. The system of claim 1, wherein the meter measures the received data, $D_{in}$, and the clean data, $D_{out}$.

14. The system of claim 1, further comprising one or more proxy servers to provide proxy services to the one or more second computers.

15. The system of claim 14, further comprising a load balancing apparatus for load balancing the proxy servers.

16. The system of claim 1, further comprising an alert apparatus to provide an alert if $D_{out}$ divided by $P_{out}$ is substantially less than $D_{in}$ divided by $P_{in}$.

17. The system of claim 16, wherein the alert apparatus provides an electronic mail alert.

18. The system of claim 16, wherein the alert apparatus provides an audible alert.

19. The system of claim 16, wherein the alert apparatus provides a visible alert.

20. The system of claim 1, wherein the one or more attack mitigation modules includes a module that determines whether a number of duplicate HTTP GET commands that have been received exceeds a threshold value.

21. The system of claim 1, wherein the one or more attack mitigation modules includes a module that determines whether a user agent header entry in an HTTP header of a data packet contains an alphabetical character, and if not, discards the data packet.

22. The system of claim 1, wherein the one or more attack mitigation modules includes a module that determines whether a host value header entry exists in an HTTP header of a data packet, and if not, discards the data packet.

23. A system for detecting an overload condition targeting one or more of a plurality of networked computer systems, comprising:
- a network connection for receiving a volume of data, $D_{in}$, over a time period, $P_{in}$, from attacking coputers located on a network; and
- a meter to detect the presence of an overload condition and data associated therewith, the overload condition being mitigated by one or more attack mitigation modules, the overload condition being directed to one or more of a plurality of target computers located on the network, the attack mitigation modules producing a volume of clean data from which all data detected to be bearing one or more characteristics determined to be associated with attempted overload conditions has been removed, $D_{out}$, over a time period, $P_{out}$, wherei the time period, $P_{out}$, is equal to the time period, $P_{in}$, the meter detecting the presence of the mitigated overload condition attempt when $D_{out}$ divided by $P_{out}$ is substantially less than $D_{in}$ divided by $P_{in}$;
- wherein the one or more attack mitigation modules function to remove the data detected to be bearing the one or more characteristics determined to be associated with attempted overload conditions at least at a time before the meter has detected the presence of the mitigated overload condition attempt.

24. The system of claim 23, wherein at least one attack mitigation module resides at the application layer.

25. A method for detecting and mitigating an attempted overload condition targeting one or more of a plurality of networked computer systems, comprising:
- receiving a volume of data, $D_{in}$, over a time period, $P_{in}$, from one or more first computers located on a network;
- detecting data, within the received data and directed to one or more of a plurality of second computers located on the network, that bears one or more characteristics determined to be associated with attempted overload conditions;
- producing a volume of clean data from which all data detected to be bearing one or more of the characteristics determined to be associated with attempted overload conditions has been removed, $D_{out}$, over a time period, $P_{out}$, wherein the time period, $P_{out}$, is equal to the time period, $P_{in}$; and
- detecting the presence of a mitigated overload condition attempt if $D_{out}$ divided by $P_{out}$ is substantially less than $D_{in}$ divided by $P_{in}$;
- wherein removal of the data detected to be bearing the one or more of the characteristics determined to be associated with attempted overload conditions occurs at least at a time before detecting the presence of the mitigated overload condition attempt.

26. The method of claim 25, further comprising sending the clean data, $D_{out}$, to the one or more second computers.

27. The method of claim 25, wherein the time period, $P_{in}$, has a start time, and the time period, $P_{out}$, has a start time, and wherein the staff time of $P_{out}$ occurs after the start time of $P_{in}$, plus a latency time period, L, for processing of the received data, $D_{in}$, by the attack mitigation modules.

28. The method of claim 25, further comprising sending cached clean data, $D_{cache}$, to the one or more second computers in place of a portion of the received data, $D_{in}$.

29. The method of claim 25, wherein $D_{out}$ divided by $P_{out}$ is substantially less than $D_{in}$ divided by $P_{in}$, if (($D_{out}$ plus $D_{cache}$) divided by $P_{out}$) is less than ($D_{in}$ divided by $P_{in}$).

30. The method of claim 25, wherein $D_{out}$ divided by $P_{out}$ is substantially less than $D_{in}$ divided by $P_{in}$, if ($D_{in}$ divided by $P_{in}$) minus ($D_{out}$ divided by $P_{out}$) is greater than a threshold value.

31. The method of claim 25, wherein $D_{out}$ divided by $P_{out}$ is substantially less than $D_{in}$ divided by $P_{in}$, if ($D_{in}$ divided by $P_{in}$) minus ($D_{out}$ divided by $P_{out}$) is greater than 0.

32. The method of claim 25, wherein the one or more first computers include one or more user computers.

33. The method of claim 25, wherein the one or more second computers include one or more server computers.

34. The method of claim 25, wherein the one or more first computers include one or more server computers.

35. The method of claim 25, wherein the one or more second computers include one or more user computers.

36. The method of claim 25, wherein the network comprises the Internet.

37. The method of claim 25, further comprising providing proxy services to the one or more second computers.

38. The method of claim 37, further comprising load balancing the proxy servers.

39. The method of claim 25, wherein detecting data that bears one or more characteristics determined to be associated with attempted overload conditions comprises determining whether a number of duplicate HTTP GET commands that have been received exceeds a threshold value.

40. The method of claim 25, wherein detecting data that bears one or more characteristics determined to be associated with attempted overload conditions comprises determining whether a user agent header entry in an HTTP header of a data packet contains an alphabetical character, and if not, discarding the data packet.

41. The method of claim 25, wherein detecting data that bears one or more characteristics determined to be associated with attempted overload conditions comprises determining whether a host value header entry exists in an HTTP header of a data packet, and if not, discarding the data packet.

42. A system for detecting an attempted overload condition targeting one or more of a plurality of networked computer systems, comprising:
a network connection for receiving a volume of data, $D_{in}$, over a time period, $P_{in}$, from one or more first computers located on a network; and
a meter to detect the presence of an attempted overload condition and data associated therewith, the overload condition being mitigated by one or more attack mitigation modules, the attempted overload condition being directed to one or more of a plurality of second computers located on the network, the attack mitigation modules producing a volume of clean data from which all data detected to be bearing one or more characteristics determined to be associated with attempted overload conditions has been removed, $D_{out}$, over a time period, $P_{out}$, wherein the time period, $P_{out}$, is equal to the time period, $P_{in}$, the meter detecting the presence of the mitigated overload condition attempt when $D_{out}$ divided by $P_{out}$ is substantially less than $D_{in}$ divided by $P_{in}$;
wherein the one or more attack mitigation modules function to remove the data detected to be bearing the one or more of the characteristics determined to be associated with attempted overload conditions at least at a time before the meter has detected the presence of the mitigated overload condition attempt.

43. The system of claim 42, wherein at least one attack mitigation module resides at the application layer.

44. A method for detecting an attempted overload condition targeting one or more of a plurality of networked computer systems, comprising:
receiving a volume of data, $D_{in}$, over a time period, $P_{in}$, from one or more first computers located on a network; and
detecting data, within the received data and directed to one or more of a plurality of second computers located on the network, that bears one or more characteristics determined to be associated with attempted overload conditions;
wherein a volume of clean data from which all data detected to be associated with the attempted overload condition has been removed, $D_{out}$, is produced over a time period, $P_{out}$, wherein the time period, $P_{out}$, is equal to the time period, $P_{in}$;
wherein detecting comprises determining the presence of the mitigated overload condition attempt if $D_{out}$ divided by $P_{out}$ is substantially less than $D_{in}$ divided by $P_{in}$; and
wherein removal of the data detected to be bearing the one or more of the characteristics determined to be associated with attempted overload conditions occurs at least at a time before detecting the presence of the mitigated overload condition attempt.

45. The system of claim 44, wherein detecting data associated with the attempted overload condition comprises examining data at the application layer.

46. A system for mitigating an overload condition targeting one or more of a plurality of networked computer systems, comprising:
a network connection for receiving a volume of data, $D_{in}$, over a time period, $P_{in}$, from one or more first computers located on a network; and
a meter to detect the presence of an overload condition and data associated therewith, the overload condition being mitigated by one or more attack mitigation modules, the overload condition being directed to one or more of a plurality of second computers located on the network, the attack mitigation modules producing a volume of clean data from which all data detected to be bearing one or more characteristics determined to be associated with attempted overload conditions has been removed, $D_{out}$, over a time period, $P_{out}$, wherein the time period, $P_{out}$, is equal to the time period, $P_{in}$, the meter detecting the presence of the mitigated overload condition attempt when $D_{out}$ divided by $P_{out}$ is substantially less than $D_{in}$ divided by $P_{in}$;
wherein the one or more attack mitigation modules function to remove the data detected to be bearing the one or more of the characteristics determined to be associated with attempted overload conditions at least at a time before the meter has detected the presence of the mitigated overload condition attempt.

47. The system of claim 46, wherein at least one attack mitigation module resides at the application layer.

48. A method for mitigating an overload condition targeting one or more of a plurality of networked computer systems, comprising:
receiving a volume of data, $D_{in}$, over a time period, $P_{in}$, from one or more first computers located on a network;
mitigating the overload condition using one or more of a plurality of mitigation modules, the overload condition being directed to one or more of a plurality of second computers located on the network, wherein a mitigation of the overload condition produces a volume of clean data from which all data that has been detected to be bearing one or more characteristics determined to be associated with attempted overload conditions has been removed, $D_{out}$, over a time period, $P_{out}$, wherein the time period, $P_{out}$, is equal to the time period, $P_{in}$; and
determining the presence of the mitigated overload condition attempt if $D_{out}$ divided by $P_{out}$ is substantially less than $D_{in}$ divided by $P_{in}$;
wherein removal of the data detected to be bearing the one or more of the characteristics determined to be associated with attempted overload conditions occurs at least at a time before detecting the presence of the mitigated overload condition attempt.

49. The system of claim 48, wherein at least one attack mitigation module resides at the application layer.

50. The system of claim 1, wherein at least one attack mitigation module resides at the application layer.

51. The system of claim 25, wherein detecting data associated with the attempted overload condition comprises examining data at the application layer.

* * * * *